(12) United States Patent
Bhagavatula et al.

(10) Patent No.: US 6,904,197 B2
(45) Date of Patent: Jun. 7, 2005

(54) BEAM BENDING APPARATUS AND METHOD OF MANUFACTURE

(75) Inventors: Venkata A. Bhagavatula, Big Flats, NY (US); Nagaraja Shashidhar, Painted Post, NY (US); John Himmelreich, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 113 days.

(21) Appl. No.: 10/202,516

(22) Filed: Jul. 23, 2002

(65) Prior Publication Data

US 2003/0165291 A1 Sep. 4, 2003

Related U.S. Application Data

(60) Provisional application No. 60/361,787, filed on Mar. 4, 2002.

(51) Int. Cl.[7] .............................................. G02B 6/26
(52) U.S. Cl. ........................................ 385/31; 385/33
(58) Field of Search ........................ 385/31–35, 38, 385/124; 264/1.26; 65/387, 415; 359/652, 654; 606/15–17

(56) References Cited

U.S. PATENT DOCUMENTS

| | | | |
|---|---|---|---|
| 4,130,343 A | 12/1978 | Miller | 350/96.15 |
| 4,756,590 A | 7/1988 | Forrest et al. | 350/96.15 |
| 4,865,417 A | 9/1989 | Yamamoto et al. | 350/96.3 |
| 4,883,333 A * | 11/1989 | Yanez | 385/12 |
| 5,163,113 A | 11/1992 | Melman | 385/31 |
| 5,293,438 A | 3/1994 | Konno et al. | 385/35 |
| 5,351,323 A | 9/1994 | Miller et al. | 385/28 |
| 5,446,816 A | 8/1995 | Shiraishi et al. | 385/33 |
| 5,455,879 A | 10/1995 | Modavis et al. | 385/33 |
| 5,606,181 A | 2/1997 | Sakuma et al. | 257/88 |
| 5,638,471 A | 6/1997 | Semo et al. | 385/33 |
| 5,657,405 A * | 8/1997 | Fujiwara | 385/12 |
| 5,719,973 A | 2/1998 | Monroe et al. | 385/34 |

(Continued)

FOREIGN PATENT DOCUMENTS

| | | | |
|---|---|---|---|
| DE | 31 34 508 A1 | 3/1983 | C03B/37/075 |
| EP | 0 155 379 A2 | 9/1985 | G02B/6/42 |
| EP | 0 558 230 A1 | 9/1993 | G02B/6/255 |
| EP | 0 802 433 A1 | 10/1997 | G02B/6/10 |
| EP | 0 872 747 A1 | 10/1998 | G02B/6/42 |
| JP | 63300206 A * | 12/1988 | G02B/6/42 |
| JP | 64042611 A * | 2/1989 | G02B/6/42 |
| JP | 02064509 A * | 3/1990 | G02B/6/42 |
| JP | 07270642 A * | 10/1995 | G02B/6/42 |
| JP | 10090553 A * | 4/1998 | G02B/6/32 |
| JP | 11248961 A * | 9/1999 | G02B/6/28 |
| JP | 2000 304965 | 2/2000 | G02B/6/32 |
| WO | WO01/71403 | 9/2001 | |

OTHER PUBLICATIONS

Yoda et al., Journal of Lightwave Technology, vol. 19, No. 12, Dec. 2001, pp. 1910–1917.

Shute et al., A Study of the Polarization Properties of a Rectangular Polarization–Maintaining Fiber, Journal of Lightwave Technology, 7(1989)Dec., No. 12.

Bludau et al., Low–Loss Laser–to–Fiber Coupling with Negligible Optical Feedback, Journal of Lightwave Technology, vol. LT–3, No. 2, Apr. 1985.

*Primary Examiner*—Ellen E. Kim
(74) *Attorney, Agent, or Firm*—Timothy M. Schaeberle; James V. Suggs

(57) ABSTRACT

An apparatus for altering the mode field of an optical signal is disclosed. The apparatus includes a GRIN-fiber lens and a reflective surface disposed at one end of the GRIN-fiber lens, the reflective surface configured to cooperate with the GRIN-fiber lens to redirect the path of the optical signal directed against the reflective surface. A method of manufacturing an apparatus for altering the mode field of an optical signal and an optical assembly are also disclosed.

40 Claims, 16 Drawing Sheets

U.S. PATENT DOCUMENTS

| | | |
|---|---|---|
| 5,774,607 A | 6/1998 | Shiraishi et al. ............... 385/33 |
| 5,953,162 A | 9/1999 | Blankenbecler ............. 359/653 |
| 6,075,650 A | 6/2000 | Morris et al. ................ 359/641 |
| 6,081,637 A | 6/2000 | Rekow ......................... 385/31 |
| 6,081,638 A | 6/2000 | Zhou ........................... 385/31 |
| 6,130,972 A | 10/2000 | Shiraishi et al. ............... 385/33 |
| 6,205,274 B1 * | 3/2001 | Zhou ........................... 385/38 |
| 6,445,939 B1 * | 9/2002 | Swanson et al. ............ 600/342 |
| 6,496,265 B1 * | 12/2002 | Duncan et al. .............. 356/479 |
| 6,564,087 B1 * | 5/2003 | Pitris et al. .................. 600/478 |
| 6,792,008 B2 * | 9/2004 | Wolak et al. ................... 372/6 |
| 2002/0076152 A1 * | 6/2002 | Hughes et al. ................ 385/35 |
| 2002/0106156 A1 * | 8/2002 | Vail et al. ..................... 385/37 |
| 2003/0004412 A1 * | 1/2003 | Izatt et al. ................... 600/425 |
| 2003/0031410 A1 * | 2/2003 | Schnitzer ..................... 385/34 |
| 2003/0156786 A1 * | 8/2003 | Pan ............................. 385/27 |

* cited by examiner

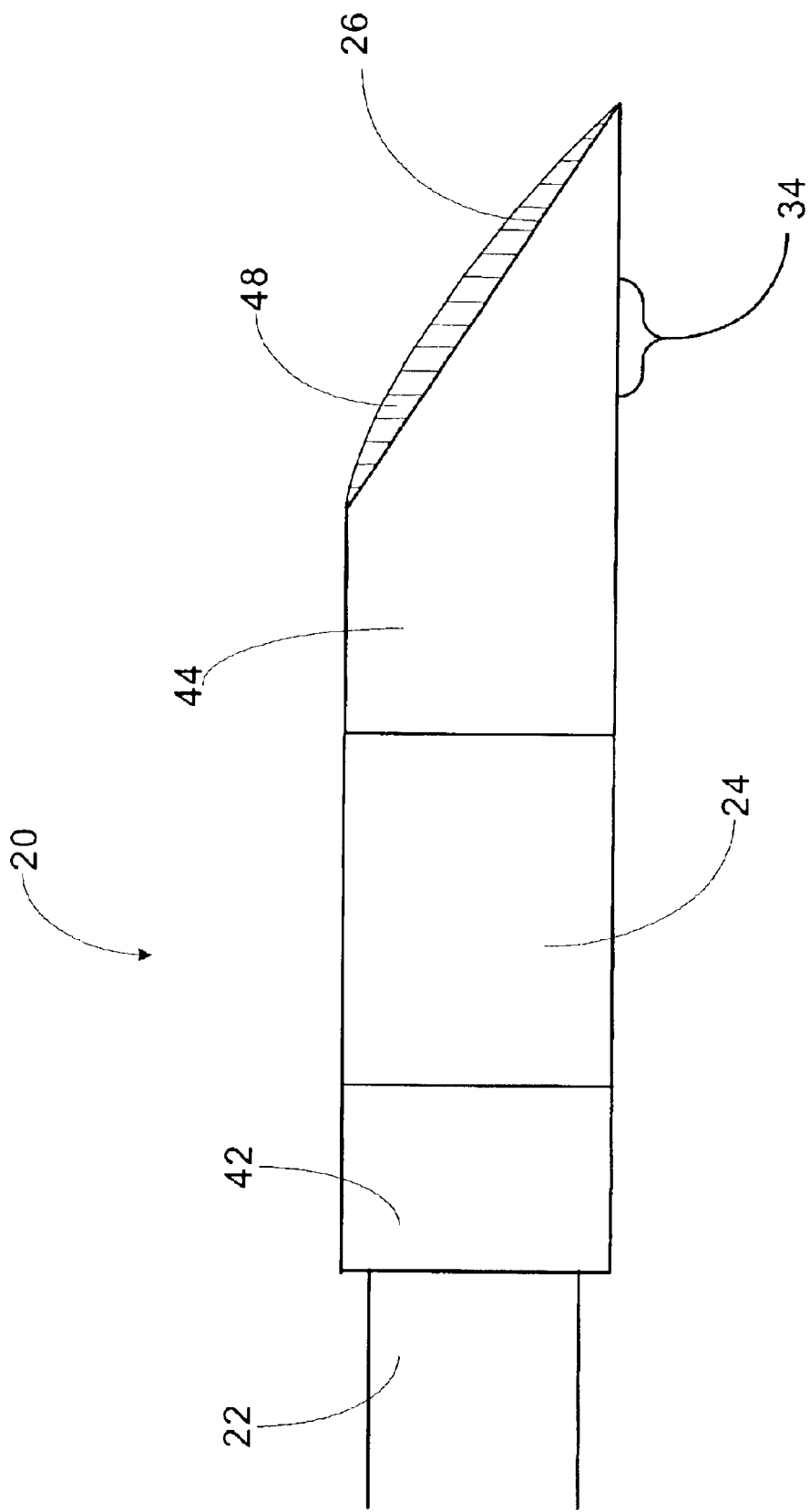

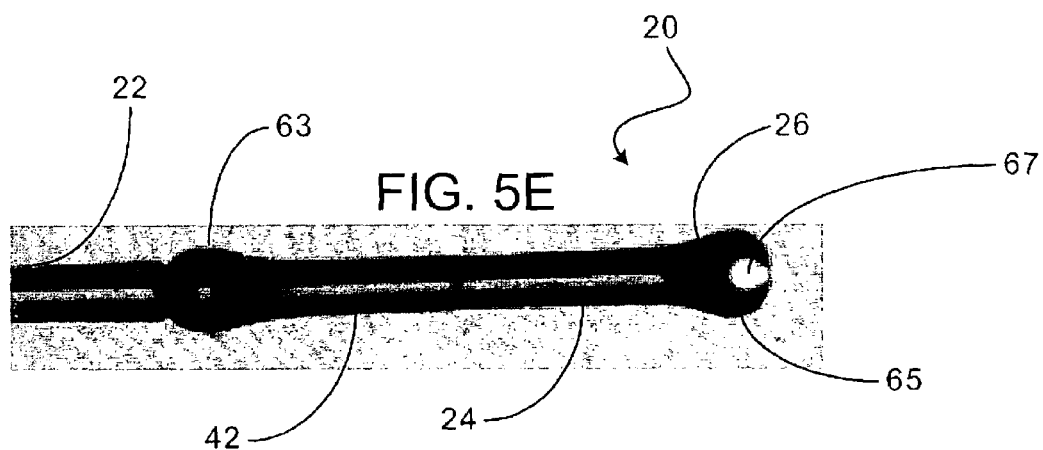
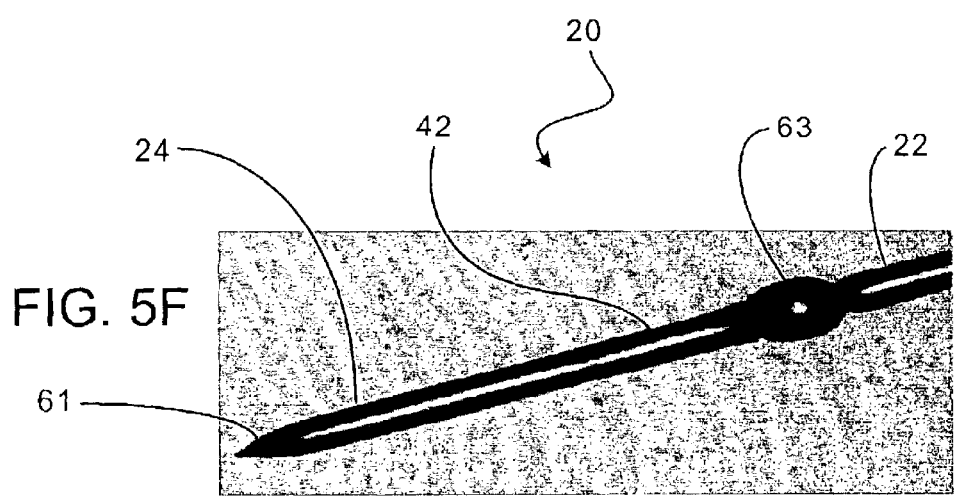
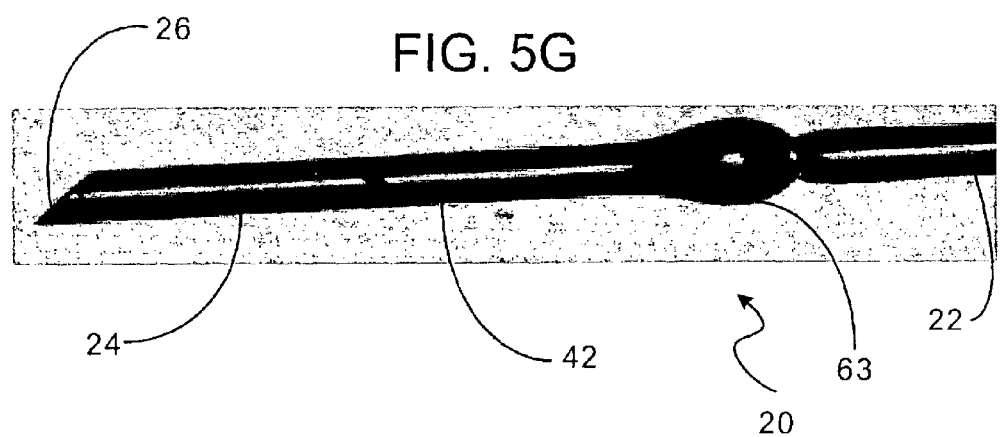

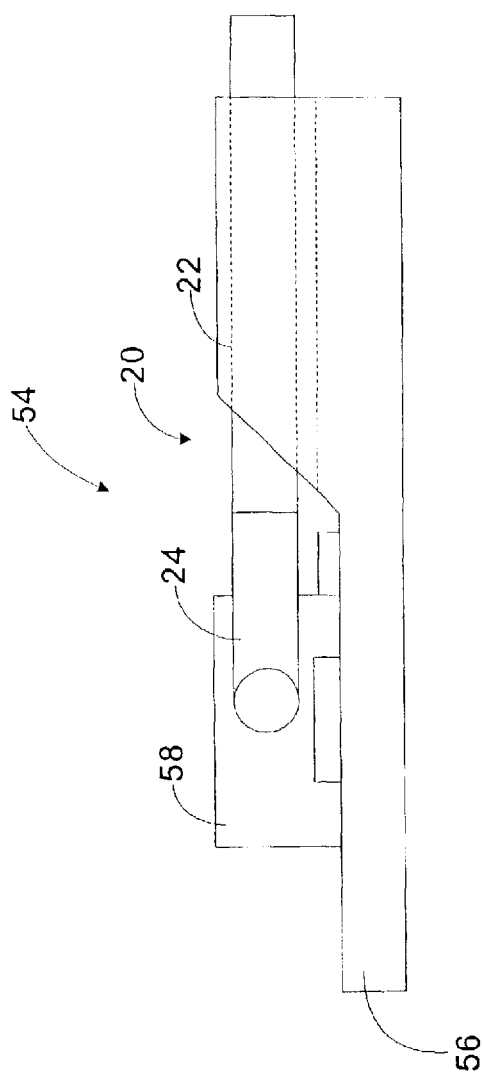
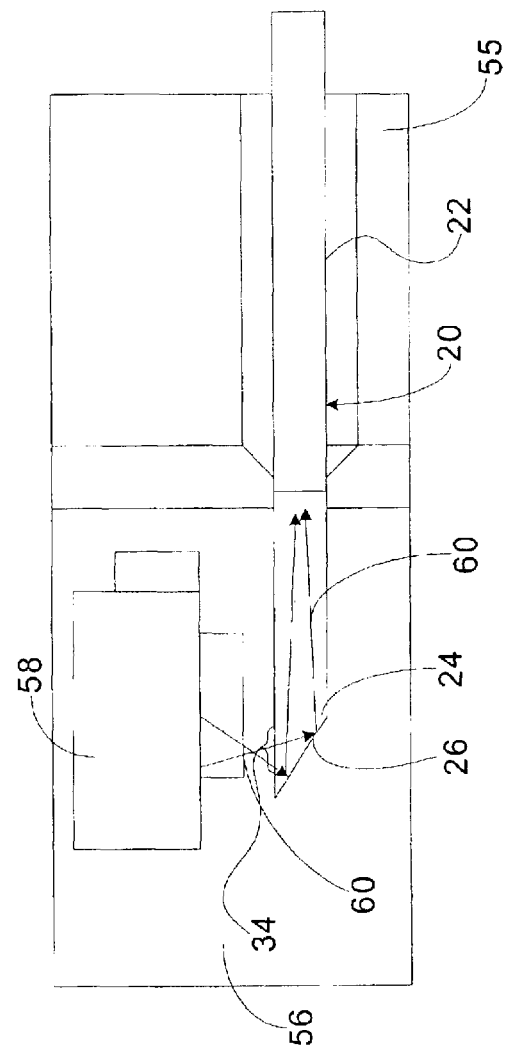
FIG. 7A
FIG. 7B

BEAM BENDING APPARATUS AND METHOD OF MANUFACTURE

CROSS REFERENCE TO RELATED APPLICATIONS

This application claims the benefit of U.S. Provisional Application Ser. No. 60/361,787, filed Mar. 4, 2002, and entitled, "Beam Altering Fiber Lens Device and Method of Manufacture," which is hereby incorporated herein by reference.

BACKGROUND OF INVENTION

1. Field of the Invention

The present invention relates generally to an optical device for non-in-line mode field interconnections, and more particularly, to a mode-transforming apparatus configured to facilitate high efficiency coupling of optical signals passed between such an apparatus and an optical component and/or other waveguide having a different mode field.

While the present invention is subject to a wide range of applications, it is particularly well suited for coupling sources of elliptically-shaped optical signals, such as laser diodes and semiconductor waveguides, to optical fibers having circularly symmetric mode fields.

2. Technical Background

Coupling optical signals passed between signal sources, such as laser diodes, optical fibers, and Semiconductor Optical Amplifiers (SOAs), and other optical components, such as optical fibers, specialty fibers, SOAs and the like with a high coupling efficiency is an important aspect of optical communications. A conventional light-emitting module incorporated in an optical communications system generally includes a semiconductor laser serving as a light source, such as a laser diode, an optical fiber having a light carrying core, and a lens such as a spherical lens, self-focusing lens or aspherical lens interposed between the semiconductor laser and optical fiber for converging the laser beam onto the optical fiber core. Since the light-emitting module typically requires high coupling efficiency between the semiconductor laser and the optical fiber, the module is preferably assembled with the optical axes of the semiconductor laser, lens, and optical fiber aligned with each other in order to achieve maximum coupling power. The relatively large size and high cost of early light-emitting modules, due in part to lens spacing and alignment issues, have driven advancement in the field and have resulted in a number of alternative approaches.

One such approach is the use of a graded-index (GRIN)-rod lens. Unlike other lenses, the index of refraction of a GRIN-rod lens is radially-dependent and is at a maximum at the optical axis of the rod lens. Generally speaking, the refractive index profile across a GRIN-rod lens is parabolic in shape, and thus it is the lens medium itself, rather than the air-lens interface, that performs the lensing. Accordingly, unlike conventional lenses, GRIN-rod lenses have planar input and output surfaces making refraction at these surfaces unnecessary. This characteristic enables optical elements at either end of the lens to be fixed in place with index-matching glue or epoxy. The index gradient is typically produced by an ion-exchange process that is both time-consuming and expensive. A typical GRIN-rod lens may be produced by ion-exchange of thallium or cesium-doped multicomponent glass. A molten salt bath may be used for the ion-exchange process such that sodium and either thallium or cesium ions diffuse out of the glass, while potassium ions diffuse into the glass from a 500° C. $KNO_3$ bath.

Since it is the refractive index profile of the lens medium resulting from this process that lenses the light, tight controls are required during the manufacturing process to ensure that a given GRIN-rod lens has the appropriate refractive index profile for a particular coupling application. Moreover, unlike GRIN-fiber lenses employed in accordance with at least one aspect of the present invention, GRIN-rod lenses are poorly adapted for splicing to standard telecommunication fibers, and/or other optical components. Generally speaking, GRIN-rod lenses are multi-component glass structures that have significantly different coefficients of thermal expansion and softening points (the temperature at which the glass softens) than the optical waveguides to which they are coupled. GRIN-fiber lenses, on the other hand are typically made by a fiber manufacturing process and are high silica composition structures. Thus, the softening points and thermal expansion coefficients of GRIN-fiber lenses are substantially similar to the softening points and thermal expansion coefficients of most telecommunication fibers and other waveguides to which they may be attached. Accordingly, GRIN-fiber lenses are well adapted to be coupled, as for instance, by fusion splicing, to most telecommunications fibers.

Another approach has been to form a microlens on an end of an optical fiber to provide optical coupling between a semiconductor laser and an optical waveguide. In such an approach, the lens is directly and integrally formed on an end face of the optical fiber at a portion of the fiber on which light from the light source is incident. Such an optical fiber is hereafter referred to as a, "lensed optical fiber". When manufacturing light-emitting modules using such lensed optical fibers, the number of required component parts can be reduced since there is no need for light-converging lenses apart from the fiber itself, and since the number of operations associated with axial alignment may also be reduced. Lensed optical fibers are referred to as anamorphic lensed optical fiber when the lens formed on the optical fiber is capable of changing the mode field of an optical signal passed therethrough. More specifically, an anamorphic lens formed on the end of the optical fiber is generally capable of changing the elliptical mode field of an optical signal emitted from a laser diode to a substantially circularly symmetric optical signal, which can be more efficiently coupled to the core of an optical fiber having a circularly symmetric mode field.

Each of the above-described approaches have various utilities and advantages that are well known in the art. Each approach does, however, have its own set of limitations. For example, while conventional GRIN-rod lens technology provides excellent symmetrical focusing characteristics for optical signals passed therethrough, GRIN-rod lenses alone generally do not significantly alter the geometric shape of an optical signal as is often required for efficient optical component coupling applications. In addition, since it is the material characteristics of the GRIN-rod lens itself that provides the focusing, precise manufacturing techniques are necessary in order to provide controlled variation of the refractive index profile of the GRIN-rod lens needed for a particular application.

Likewise, while anamorphic fiber lenses readily facilitate the changing of the geometric shape of the optical signal or beam passing through them, the range of available working distances for anamorphic lens applications is somewhat limited. Accordingly, if suitable working distances are not available for particular applications, coupling losses may be significant, thereby making many coupling applications impractical.

Generally speaking, the above-mentioned known devices are most often employed for "in-line" optical signal coupling applications. Stated differently, the optical signal to be coupled is generally traveling along a path that is substantially co-linear with the optical axes of the devices between which the optical signal is coupled. Without the aid of mirrors, or other optical devices and structures, the above-mentioned known devices are poorly adapted for, "off-line" coupling applications, i.e., those coupling applications where an optical signal to be coupled is traveling along a path that is not co-linear with the optical axis of the device to which the optical signal is to be coupled. By way of example, but not limitation, an optical signal may be emitted from one device at an angle of approximately 90° in relation to the optical axis of a device to which the optical signal is to be coupled. In such a case, the optical signal will have to be redirected or bent in order to facilitate proper optical signal coupling.

What is needed therefore, but presently unavailable in the art, is an apparatus for optical signal coupling applications that overcomes these and other shortcomings associated with the use of anamorphic lenses or GRIN-rod lenses. Such an apparatus should be capable of changing the size, and/or, geometric shape, and/or other mode field characteristics of an optical signal passing through the apparatus, while at the same time providing design flexibility that will limit coupling losses, allow a broader range of acceptable working distances, minimize phasefront aberrations, and generally provide greater control and efficiency in optical signal coupling applications. In addition, the mode-transforming apparatus of the present invention should preferably be capable of redirecting the path of an optical signal with minimum loss. Such an apparatus should be relatively inexpensive to manufacture, be relatively easy to mass produce, and in general, have a far broader range of applications without significantly altering the material properties and characteristics of the apparatus itself. It is to the provision of such an apparatus that the present invention is primarily directed.

SUMMARY OF THE INVENTION

One aspect of the present invention is directed to an apparatus for altering the mode field of an optical signal. The apparatus includes a GRIN-fiber lens and a reflective surface disposed at one end of the GRIN-fiber lens, the reflective surface configured to cooperate with the GRIN-fiber lens to redirect the path of an optical signal directed against the reflective surface.

In another aspect, the present invention relates to an optical assembly. The optical assembly includes an optical component, a substrate configured to support the component, and an apparatus positioned on the substrate and in relation to the optical component to change the mode field of an optical signal passed between the apparatus and the optical component. The apparatus includes a GRIN-fiber lens and a reflective surface disposed at one end of the GRIN-fiber lens. The reflective surface is configured to cooperate with the GRIN-fiber lens to redirect the path of an optical signal directed against the reflective surface.

In yet another aspect, the present invention is directed to a method of manufacturing an apparatus for altering the mode field of an optical signal. The method includes the step of disposing a reflective surface at an end of a GRIN-fiber lens, wherein the reflective surface is configured to cooperate with the GRIN-fiber lens to redirect the path of an optical signal directed against the reflective surface.

The beam bending apparatus of the present invention results in a number of advantages over other mode-transforming devices known in the art. In one respect, since a mode-transforming lens may be formed directly on a GRIN-fiber lens, the geometric shape and/or size of the mode field of an optical signal may be altered by the mode-transforming lens, while the focusing of the altered optical signal may be largely performed by the GRIN-fiber lens. As a result, the wavefront of the optical signal may be better matched to that of the optical component or other waveguide to which the optical signal is coupled. Accordingly, coupling losses are minimized and phasefront aberrations are reduced. The beam bending apparatus of the present invention may also be designed to provide for a greater range of operative working distances. As a result of these and other advantages, coupling efficiencies are greatly improved.

In addition to these advantages, the GRIN-fiber lens itself provides a number of advantages in the manufacture of the present invention. As mentioned hereinabove, GRIN-fiber lenses are preferably high silica containing structures preferably made by conventional multi-mode fiber manufacturing processes. Because GRIN-fiber lenses are made by telecommunication fiber manufacturing techniques, GRIN-fiber lenses manufactured in accordance with the present invention may be drawn to the desired dimensions with a high degree of accuracy. Generally speaking, GRIN-fiber lenses may be drawn having an outside diameter ranging from about 25.0 microns to about 1000.0 microns. More preferably, such GRIN-fiber lenses may be drawn such that they have outside diameters ranging from about 50.0 microns to about 500.0 microns. More preferably such GRIN-fiber lenses may have an outside diameter of between about 75.0 microns to about 250.0 microns. In addition, since GRIN-fiber lenses may be drawn using traditional fiber drawing equipment, large diameter rods or blanks may be manufactured and thereafter drawn to long lengths (up to several kilometers) of fiber while maintaining the material properties, such as, but not limited to, the core to clad ratio of the original large diameter rod, thus making manufacturing and splicing easier. Accordingly, the desired refractive index profile, among other characteristics, of the GRIN-fiber lens may be designed into the larger rod or blank which provides for precision submicron control over the resulting GRIN-fiber lens optical properties.

In addition to these advantages, GRIN-fiber lenses may be fabricated in accordance with the present invention such that they have the predetermined material characteristics for more than one mode-transforming application. Since a mode-transforming lens may be formed on the GRIN-fiber lens or on a coreless spacer rod or fiber affixed to the GRIN-fiber lens, rather than the pigtail fiber itself, GRIN-fiber lenses and coreless spacer rods having the same length, formed of the same materials, having the same aspect ratios, and having the same cross-sectional areas may be affixed to pigtail fibers having different characteristics and/or mode fields. Thereafter, each GRIN-fiber lens and/or coreless rod may be altered, by cleaving to the appropriate length, for example, to provide the required mode field transforming functionality required for the particular fiber pigtail to which each GRIN-fiber lens and/or spacer rod is affixed. As will be described in greater detail, this may preferably be accomplished by cleaving or otherwise cutting each GRIN-fiber lens and/or spacer rod to the desired length and configuring the cut end of each GRIN-fiber lens and/or rod to have the desired optical signal altering properties.

Manufacturing of the spacer rod in accordance with the present invention provides additional advantages. Generally speaking, the spacer rod has a substantially uniform refractive index that is made from silica, some other high silica glass containing material, or may be a 96% silica glass manufactured by Coming, Incorporated and known as Vycor®. Generally speaking, and in accordance with the present invention, the spacer rod may be cylindrical in shape, may be rectangular in shape, or may be manufactured to take on some other geometric shape. Like the GRIN-fiber lens discussed above, the spacer rods are preferably manufactured from an approximately one (1) meter long rod or blank that is drawn, using conventional fiber manufacturing techniques and equipment, to the desired diameter, such as, but not limited to, 125.0 microns. Generally speaking, the spacer rod is drawn in kilometer lengths (preferably such that the material properties of the original large diameter rod are maintained) and thereafter cut or cleaved to the appropriate length for the particular mode-transforming application.

In certain applications, it may be advantageous to utilize a spacer rod that is other than cylindrical in shape. For example, and in accordance with the present invention, it may be preferable to utilize a spacer rod that is substantially rectangular in shape. In such instances it may be preferable to first form a blank approximately one (1) meter in length that is itself rectangular in shape. The rectangular blank may then be drawn using conventional fiber drawing techniques and equipment to form a substantially rectangular spacer rod having a desired outside diameter such as 125.0 microns. In this way, several kilometers of substantially rectangular shaped spacer rod material may be drawn from a single blank and thereafter cut to the desired lengths to create spacer rods having the desired optical properties. While the edges of the resultant rectangular spacer rod material may likely become somewhat rounded during the drawing process, a substantially rectangular shape will be maintained provided the temperature of the draw furnace, the drawing speed, and the tension under which the rod material is drawn are controlled. Moreover, the aspect ratios and other optical properties of the final cleaved rectangular spacer rods formed by the drawing process will be substantially maintained. Such processing facilitates mass manufacturing and controlled dimensions of the final spacer rod. Those skilled in the art will recognize that the manufacturing techniques described above are equally applicable to the manufacture of GRIN-fiber lenses in accordance with the present invention.

The beam bending apparatus of the present invention provides additional advantages for optical assemblies and other packaging arrangements. The beam bending apparatus of the present invention provides for working distances as large as about twenty (20.0) microns or more, which is significantly larger than working distances provided by anamorphic and other mode-transforming apparatus known in the art. As a result, coupling to a laser diode or other semiconductor device with low loss is facilitated due in part to the relaxed alignment tolerances between the apparatus and the semiconductor device.

All of the above-mentioned aspects of the present invention provide for large scale production of GRIN-fiber lenses and/or spacer rods, which in turn facilitates ease of manufacture, reduced costs associated with the manufacturing process, and greater economies of scale. The apparatus of the present invention may be constructed such that the mode field of an optical signal passing therethrough may be changed from an elliptical mode field to a circular mode field, from a circular mode field to an elliptical mode field, from a mode field having one ellipticity to a mode field having a different ellipticity, or from one mode field to another mode field having the same shape but a different size. Moreover, the apparatus of the present invention may be designed such that it may alter the mode field of an optical signal passing therethrough, in either direction.

Additional features and advantages of the invention will be set forth in the detailed description which follows and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide further understanding of the invention, illustrate various embodiments of the invention, and together with the description serve to explain the principles and operation of the invention.

BRIEF DESCRIPTION OF THE DRAWINGS

FIG. 1A' schematically depicts a side view of a first alternative exemplary embodiment of a beam bending apparatus in accordance with the present invention.

FIG. 1B' schematically depicts a side view of a third alternative exemplary embodiment of a beam bending apparatus in accordance with the present invention.

FIG. 1C' schematically depicts a side view of a fifth alternative exemplary embodiment of a beam bending apparatus in accordance with the present invention.

FIG. 5A schematically depicts a side view of yet another alternative exemplary embodiment of the beam bending apparatus of the present invention.

FIG. 5E is a photomicrograph depicting another alternative exemplary embodiment of the beam bending apparatus of the present invention.

FIGS. 5F–5G are photomicrographs depicting various stages of manufacture of yet another alternative exemplary embodiment of the beam bending apparatus of the present invention.

FIGS. 7A–7B schematically depict side and top views, respectively, of an exemplary optical assembly incorporating the beam bending apparatus depicted in FIG. 1B in accordance with the present invention.

DETAILED DESCRIPTION OF THE PREFERRED EMBODIMENTS

Figure 1A:
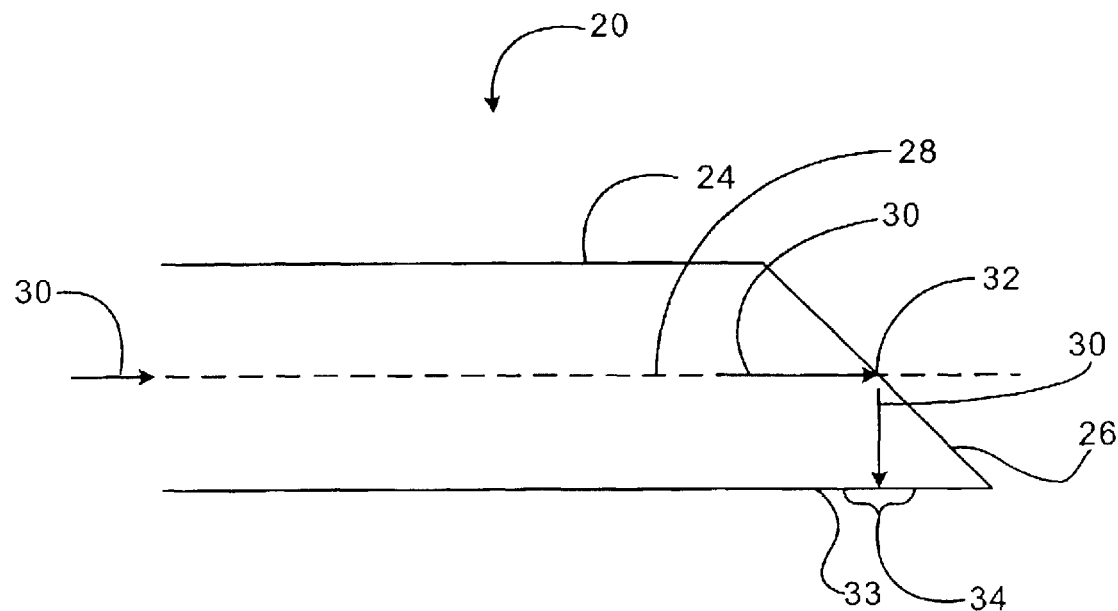
FIG. 1A schematically depicts a side view of an exemplary embodiment of a beam bending apparatus in accordance with the present invention.
Figure 1A:
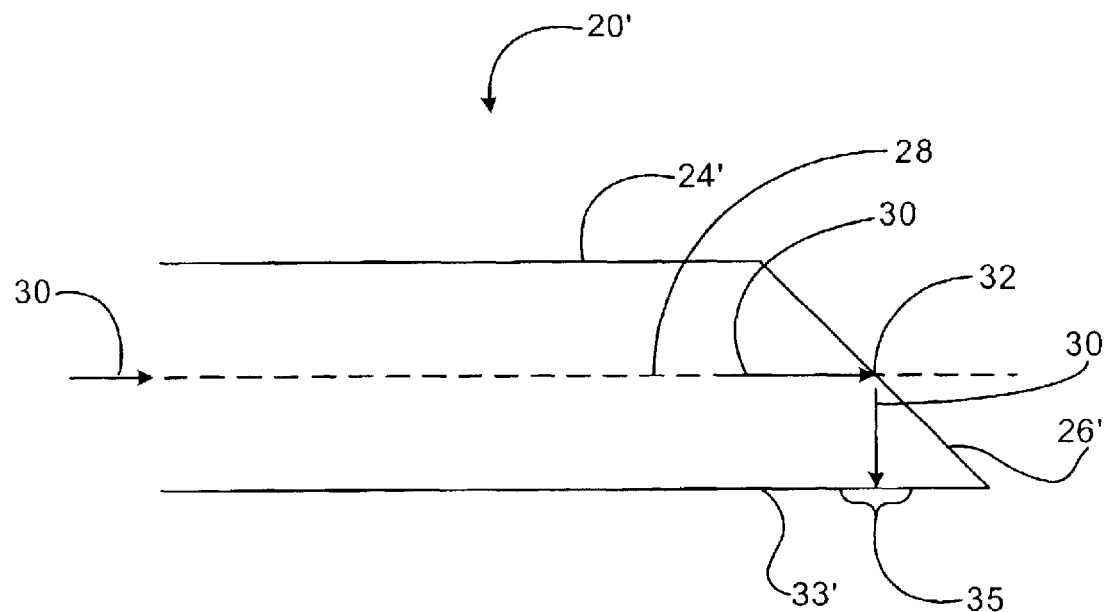

Reference will now be made in detail to the present preferred embodiments of the invention, examples of which are illustrated in the accompanying drawing figures. Wherever possible, the same reference numerals will be used throughout the drawings to refer to the same or like parts. An exemplary embodiment of the beam bending apparatus of the present invention is shown in FIG. 1A and is designated generally throughout by reference numeral 20.

Generally speaking, exemplary beam bending apparatus 20 depicted in the side view of FIG. 1A includes a GRIN-fiber lens 24 having a square law index or parabolic refractive index profile and a reflective surface 26 disposed at one end of GRIN-fiber lens 24. In accordance with one aspect of the present invention, a beam, preferably an optical signal 30, may enter GRIN-fiber lens 24 and travel generally along an optical axis 28 extending longitudinally through GRIN-fiber lens 24. As will be explained in greater detail below, optical signal 30 is preferably reflected at reflective surface 26 and is redirected or bent such that optical signal 30 passes through a side surface 33 of GRIN-fiber lens 24. In the embodiment depicted in FIG. 1A, GRIN-fiber lens 24 is preferably cylindrical in shape. Accordingly, that portion of side surface 33 through which optical signal 30 passes is preferably a curved surface 34. In accordance with another aspect of the present invention, as optical signal 30 passes through curved surface 34, characteristics of the mode field of optical signal 30 are preferably changed. For example, when the mode field of optical signal 30 is substantially circular in shape as it travels through GRIN-fiber lens 24 as shown in FIG. 1A, the mode field shape may preferably be changed from a substantially circularly symmetric mode field to an ellipitcal mode field as optical signal 30 passes through curved surface 34.

A first alternative, exemplary beam bending apparatus 20' is depicted in the side view of FIG. 1A'. Unlike the embodiment discussed above, GRIN-fiber lens 24' is substantially rectangular in shape, or may otherwise be defined by planar side surfaces 33'. Reflective surface 26' may preferably be a beveled surface disposed at one end of GRIN-fiber lens 24'. When optical signal 30 is reflected at reflective surface 26', it is preferably redirected such that it passes through a substantially planar surface 35, thereby altering the mode field characteristics of optical signal 30. While planar surface 35 preferably does not change the shape of the mode field of optical signal 30, it preferably changes the mode field size. Although not shown in the drawing figures, one of skill in the art will recognize that the same mode field effect may be achieved with a substantially cylindrical GRIN-fiber lens 24 when a portion of side surface 33 is polished or otherwise constructed to include a planar surface 35 at the location where redirected optical signal 30 passes through side surface 33. Such a planar surface 35 may be formed on side surface 33 by, for example, laser micro-machining.

Figure 1B:
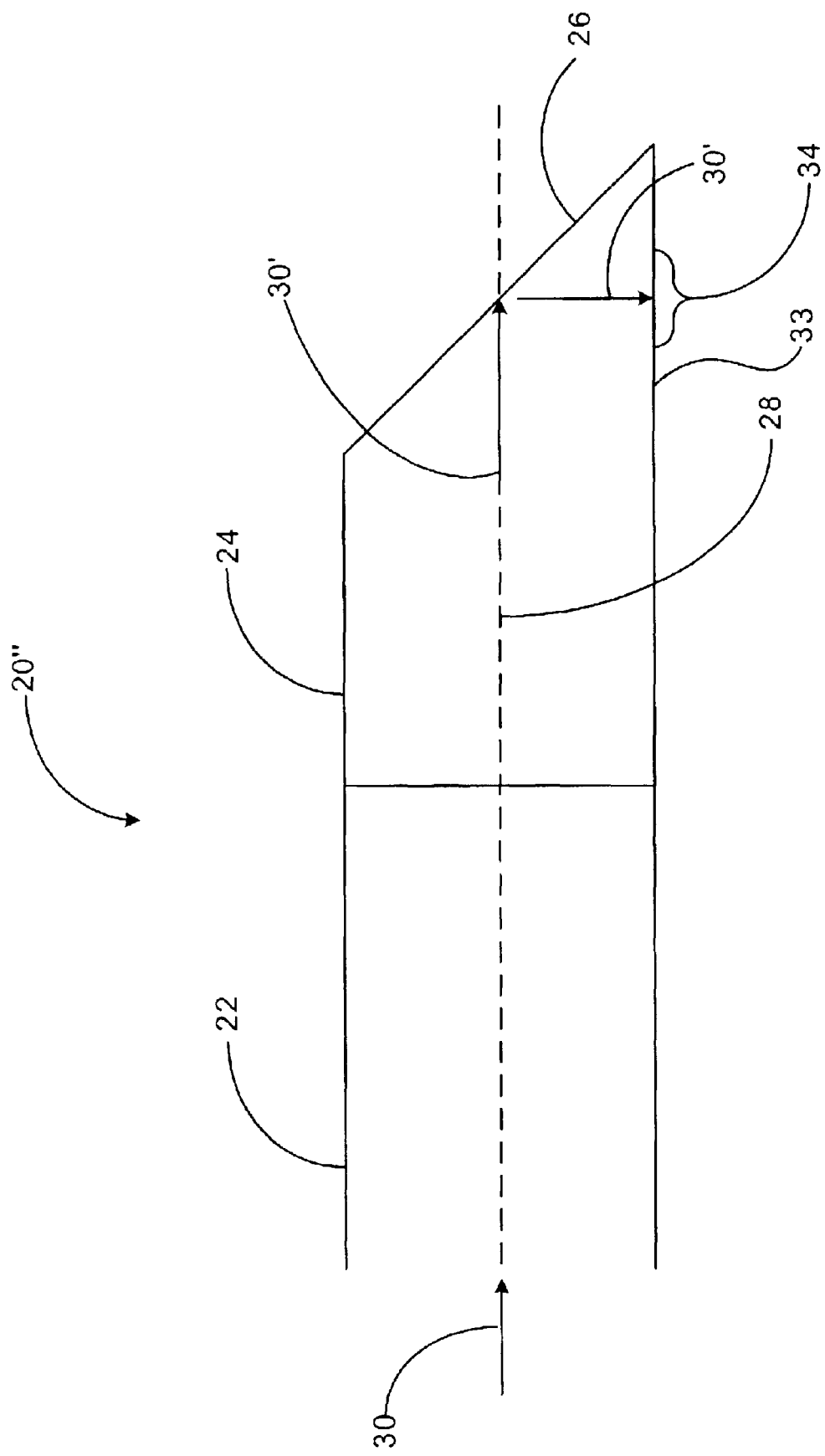
FIG. 1B schematically depicts a side view of a second alternative exemplary embodiment of a beam bending apparatus in accordance with the present invention.
Figure 1B:
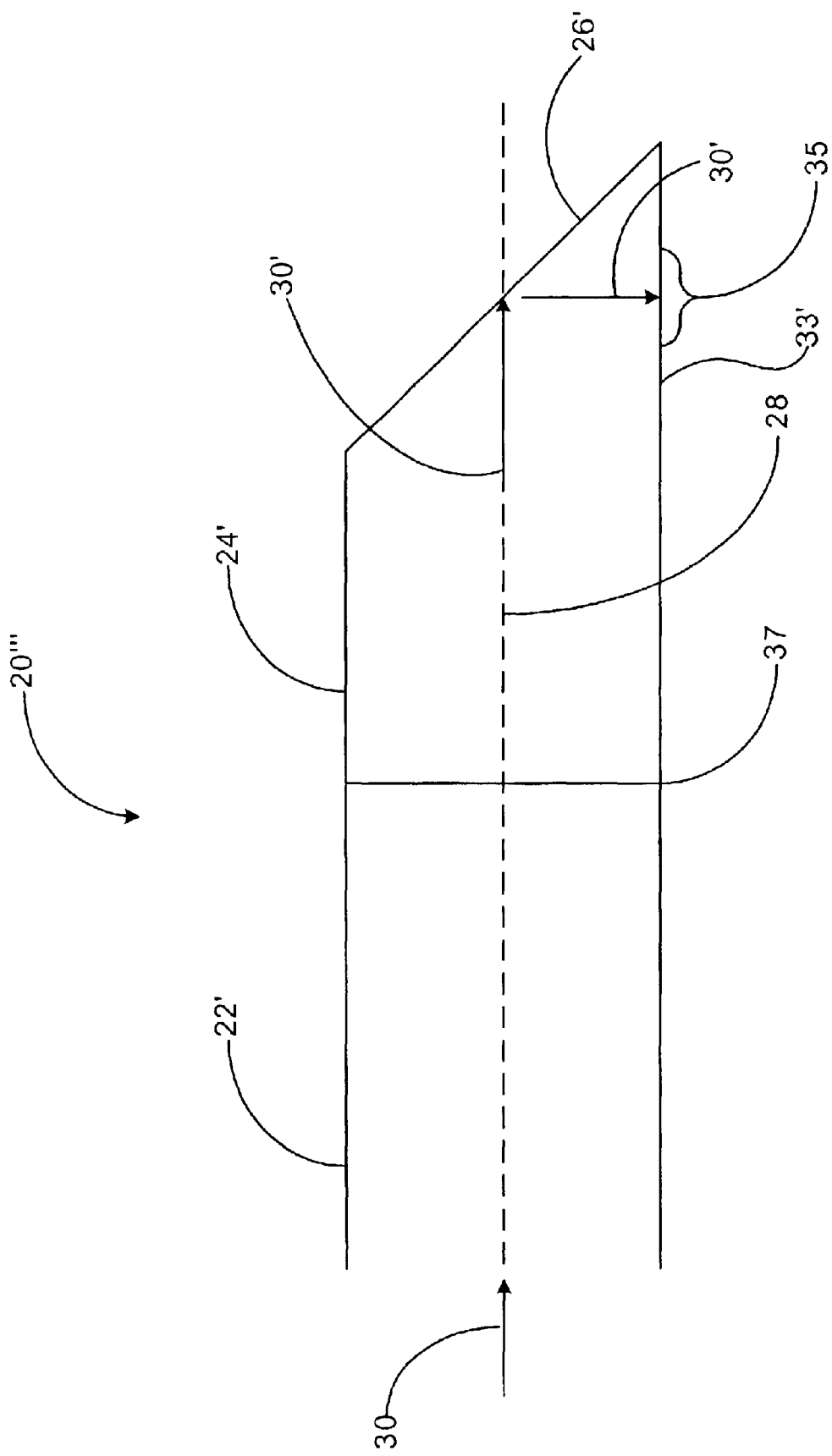

A second alternative, exemplary embodiment of beam bending apparatus 20" is depicted in the side view of FIG. 1B. The beam bending apparatus 20" preferably includes an optical fiber or pigtail fiber 22, a GRIN-fiber lens 24 affixed to one end of pigtail fiber 22, preferably by splicing, and a reflective surface 26, in this case a beveled surface, disposed at an end of GRIN-fiber lens 24 remote from pigtail fiber 22. Pigtail fiber 22 may be a standard single mode fiber, such as an SMF-28 fiber manufactured by Corning, Inc., a polarization maintaining (PM) fiber, a multi-mode fiber or other specialty fiber, such as a high index fiber, used in optical communication systems. Moreover, pitgtail fiber 22 may be circularly symmetric when viewed from the end as depicted in FIG. 1B, or may be any other shape. Although reflective surface 26 is formed directly on then end of GRIN-fiber lens 24 in the embodiment depicted in FIG. 1B, reflective surface 26 may be disposed or fashioned on one end of a separate coreless spacer rod, which may itself be affixed to an end of GRIN-fiber lens 24 remote from pigtail fiber 22 as will be described in greater detail below with reference to FIG. 4A and 4B. In operation, an optical signal 30 is passed through pigtail fiber 22 and into GRIN-fiber lens 24 where the signal is altered by the parabolic refractive index profile of GRIN-fiber lens 24. Altered optical signal 30' is preferably reflected at reflective surface 26 and redirected through curved surface 34 of side surface 33 of GRIN-fiber lens 24. Like the embodiment depicted in FIG. 1A, the shape of the mode field of altered optical signal 30' is preferably changed as altered optical signal 30' passes through curved surface 34.

A third alternative, exemplary beam bending apparatus 20''' is depicted in the side view of FIG. 1B'. Beam bending apparatus 20''' preferably includes a pigtail fiber 22' preferably rectangular in shape, a GRIN-fiber lens 24' preferably rectangular in shape, and a reflective surface 26' disposed at an end of GRIN-fiber lens 24' remote from pigtail fiber 22'. Like the embodiment depicted in FIG. 1B, optical signal 30 is altered by the properties of GRIN-fiber lens 24' once optical signal 30 passes through splice junction 37. As altered optical signal 30' passes through GRIN-fiber lens 24' it is preferably reflected at reflective surface 26' such that it passes through planar surface 35 of side surface 33'. While planar surfaces 35 preferably does not change the shape of the mode field of altered optical signal 30', it preferably changes the mode field size.

Figure 1C:
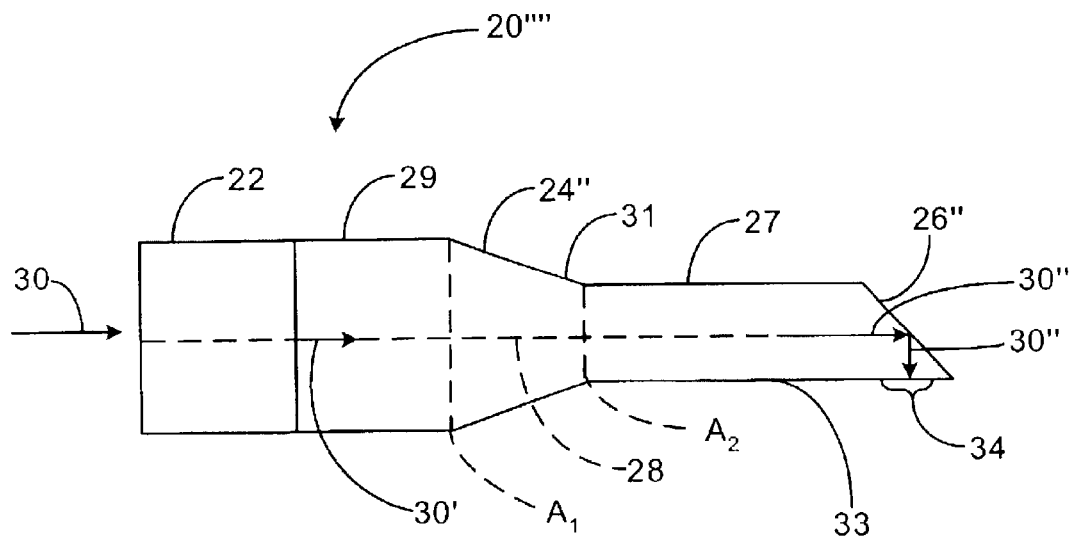
FIG. 1C schematically depicts a side view of a fourth alternative exemplary embodiment of a beam bending apparatus in accordance with the present invention.
Figure 1C:
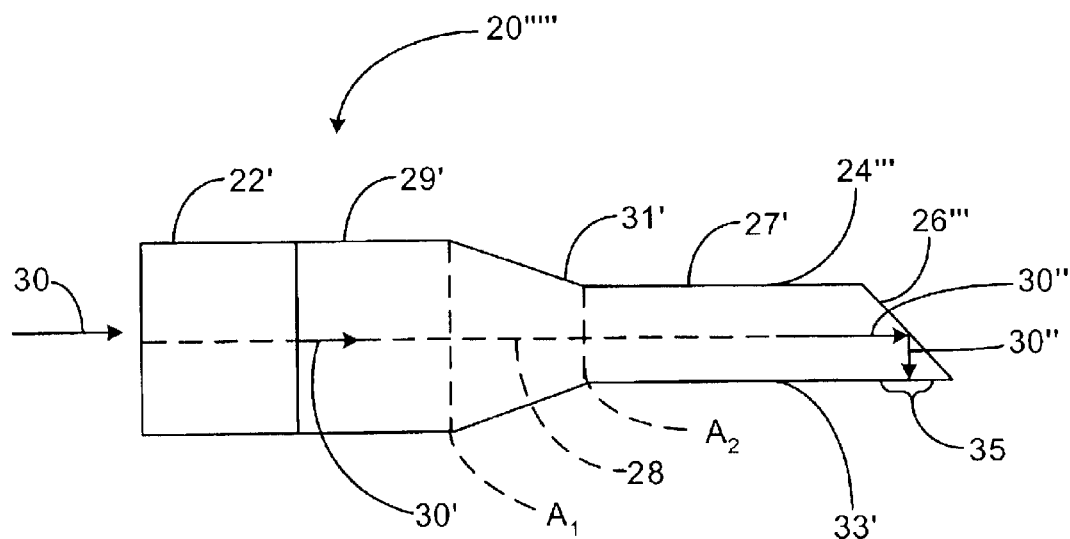

In accordance with another aspect of the present invention, the fourth alternative, beam bending apparatus 20"", 20''''' of the present invention may be formed to include one or more tapered elements as shown in FIGS. 1C and 1C', respectively. Such a tapered multi-lens apparatus 20"" may preferably include a pigtail fiber 22, a tapered GRIN-fiber lens 24" having a square law index or a parabolic refractive index profile positioned at one end of pigtail fiber 22 and a reflective surface 26" disposed at an end of GRIN-fiber lens 24" remote from pigtail fiber 22. As shown in FIG. 1C, tapered GRIN-fiber lens 24" preferably includes a GRIN-fiber section 29 having a substantially uniform or constant radial outside dimension extending longitudinally from an end of pigtail fiber 22 to phantom line $A_1$, a tapered GRIN-fiber section 31 having a changing, preferably decreasing, radial outside-dimension (or sloping external surface) extending longitudinally between phantom lines $A_1$ and $A_2$, and a reflective surface section 27 having a substantially uniform or constant radial outside dimension extending longitudinally from phantom line $A_2$ to reflective surface 26". Although not shown in the drawing figures, one of skill in the art will recognize that one or more of pigtail fiber 22, coreless spacer rod(s) and/or GRIN-fiber lens(es), may be tapered in a manner similar to tapered GRIN-fiber lens 24" depicted in FIG. 1C for any of the embodiments described and/or depicted herein. Tapered GRIN-fiber section 31 preferably changes altered optical signal 30' resulting in an altered optical signal 30" being reflected at reflective surface 26". The redirected altered optical signal 30" then preferably passes through curved surface 34, which preferably changes the mode field shape of altered optical signal 30".

A fifth alternative, exemplary embodiment of beam bending apparatus 20"" of the present invention is depicted in FIG. 1C'. The construction and operation of beam bending apparatus 20"" depicted in FIG. 1C' is similar to the construction and operation of beam bending apparatus 20"" depicted in FIG. 1C. The beam bending apparatus 25', however, is preferably rectangular in shape rather than substantially circularly symmetric. Accordingly, beam bending apparatus 20"" preferably includes a substantially rectangular pigtail fiber 22' a tapered GRIN-fiber lens 24'" having planar side surfaces 33' and a planar surface 35 through which altered optical signal 30" passes after it is reflected at reflective surface 26'". When altered optical signal 30" passes through planar surface 35, the size of the mode field of altered optical signal 30" preferably changes rather than the mode field shape.

Unless otherwise stated herein, in each of the depicted embodiments, pigtail fiber 22 and its variations will be described as being an SMF-28 fiber having an outside diameter of approximately 125.0 microns and a core diameter of approximately 8.0–10.0 microns. Those skilled in the art will recognize that other pigtail fibers having other diameters and other geometric shapes are also within the scope of the present invention. In addition, further details relating to the structure, design, manufacture, and manufacturing advantages of the beam bending apparatus of the present invention may be found in co-pending U.S. patent applications entitled, "Beam Altering Fiber Lens Device and Method of Manufacture," filed, Jul. 23, 2002, and "Optical Signal Altering Lensed Apparatus and Method of Manufacture," filed, Jul. 23, 2002, both of which are commonly owned by Corning Incorporated, and are hereby incorporated herein by reference.

Generally speaking, all of the disclosed embodiments include a pigtail fiber having a core region bounded by a cladding region. GRIN-fiber lens 24 and its variations also preferably includes a core region that may or may not be bounded by a cladding region. In a preferred embodiment, the relative refractive index profile of a GRIN-fiber lens of the present invention increases radially toward the optical axis of the beam bending apparatus. One end of a GRIN-fiber lens is preferably spliced to one end of a pigtail fiber via an arc fusion splicer or some other device commonly known in the art, either before or after the GRIN-fiber lens is cleaved to the appropriate length. A reflective surface is preferably disposed at an end of the GRIN-fiber lens remote from the pigtail fiber. In this and other exemplary embodiments disclosed herein, the reflective surface may preferably be a beveled surface formed by conventional polishing techniques, by laser micro-machining, or by other methods that will be described in greater detail below.

Unlike the embodiments disclosed in the applications incorporated herein by reference, which are directed to in-line coupling geometries, the exemplary embodiments disclosed herein are preferably directed to non-in-line coupling geometries or off-line coupling geometries, which in addition to changing the mode field of an optical signal, preferably facilitate the redirection or bending of the optical signal. Returning now to FIG. 1A, beam bending apparatus 20 preferably defines an optical axis 28 extending longitudinally through its center along which an optical signal will travel through beam bending apparatus 20. In the exemplary embodiment depicted in FIG. 1A, GRIN-fiber lens 24 is preferably designed at or close to quarter pitch length. It should be noted, however, that GRIN-fiber lens 24 is not limited to a quarter pitch, but may be designed to quarter pitch length for special applications such as large aspect ratio lensing applications.

In applications known in the art, GRIN-fiber lenses are typically manufactured to have an outside diameter that matches the outside diameter of the optical waveguide to which it is attached. Thus, when the outside diameter of the optical waveguide is 125.0 microns, the GRIN-fiber lens is also preferably manufactured to have an outside diameter of 125.0 microns. Thus, when two optical waveguides, each having outside diameters of 125.0 microns have different mode fields, the difference in the refractive index profile $\Delta$ is changed for each GRIN-fiber lens so that the GRIN-fiber lenses can meet the specifications while maintaining the same 125.0 micron outside diameter. In accordance with the present invention, the outside diameter of the GRIN-fiber lens need not be maintained at 125.0 microns. Instead, the difference in the refractive index $\Delta$ of the GRIN-fiber lens is kept substantially the same and the outside diameter, core diameter and length of each GRIN-fiber lens is preferably changed to meet the mode-transforming requirements of each optical waveguide. In accordance with the present invention, the length of each GRIN-fiber lens may be different than the quarter pitch when necessary. As a result, and in accordance with the present invention, the same blank may be used to draw GRIN-fiber lenses for use in various applications. Since the refractive index profile of the blank need not be changed, the blank making process and GRIN-fiber lens making process may be simplified. Accordingly, the same blank can be used for different mode-transforming applications. The blank is preferably redrawn to different outside diameters for different applications and the resulting GRIN-fiber lens may be cut or cleaved to different lengths to meet the requirements for different applications.

GRIN-fiber lens 24 also preferably includes a reflective surface 26 which preferably is comprised of a beveled surface formed, for example, by laser micro-machining GRIN-fiber lens 24 to the desired length and at the desired angle with respect to optical axis 28. In operation, an optical signal 30 is passed through pigtail fiber 22 and the GRIN-fiber lens 24 and impacts reflective surface 26, in this case a beveled surface. It should be noted that the optical signal may be diverging, converging, focusing or collimating as it passes through the GRIN-fiber lens. When the beveled surface is formed at an angle of about 45° or close to the critical angle for the materials used with respect to the optical axis, the air/glass or other media/glass interface 32 defined by reflective surface 26 causes optical signal 30 to be totally internally reflected and fall on a side curved surface 34 of GRIN-fiber lens 24. Surface 34 preferably acts as an (aspherical) cylindrical lens and focuses the beam along one axis but not the other. One of the advantages of this approach is that the cylindrical lens is self-aligned with the GRIN-fiber lens. Another advantage is that the curvature of the surface is precisely controlled by controlling the diameter of the GRIN-fiber lens or the spacer rod if the reflective surface is disposed on an end of a spacer rod rather than on the end of a GRIN-fiber lens. Also, since the GRIN-fiber lenses or the spacer rods may be mass produced by traditional fiber redraw processes, the surface quality of the curved surfaces 34 forming the cylindrical lenses may be very high. Moreover, for a 45° beveled reflective surface 26, with air and silica glass interface, the image preferably forms at 90° with respect to the optical axis 28 extending longitudinally through pigtail fiber 22 and GRIN-fiber lens 24. In accordance with aspects of the present invention, the focused image size and aspect ratios can be varied with proper control of various properties of the GRIN-fiber lens 24, such as, but not limited to, its core and outside diameter, its relative refractive index difference, the use of coreless spacer rods having a uniform or constant index of refraction, and as will be described in greater detail below, with the use of other reflective materials or surfaces in lieu of or in addition to a beveled surface.

These and other beam bending apparatus, which will be described in greater detail below, may be very useful for coupling optical signals passed between pigtail fibers and laser diodes or other optical waveguides. Utilizing such a beam bending apparatus provides other advantages such as working distances as large as 20.0 microns or more compared to commercially available fiber lenses that are conventionally polished on the end of a single mode fiber. This larger working distance facilitates relaxed alignment tolerances between the GRIN-fiber lens of the present invention and the laser diode or other optical component between which an optical signal is passed.

Figure 2:
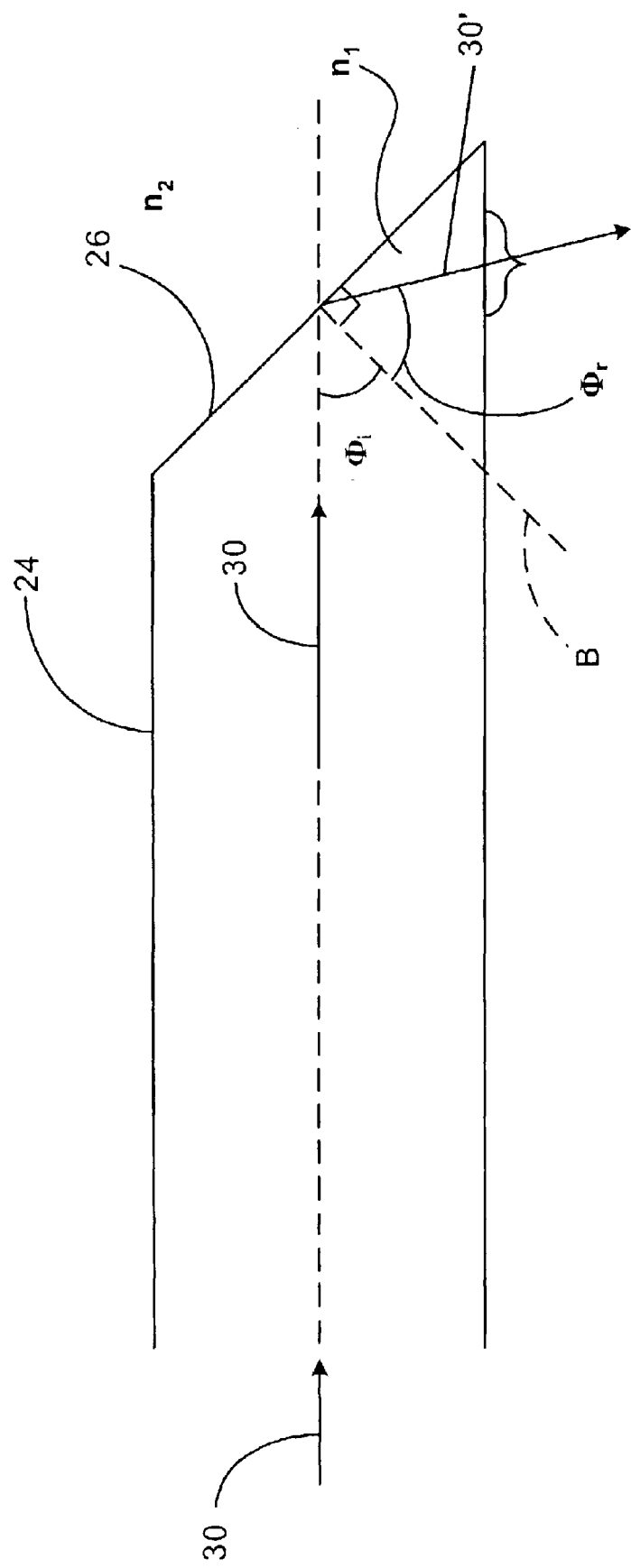
FIG. 2 is a cross-sectional view of the beam bending apparatus of FIG. 1B depicting the angle of incidence of an optical signal being reflected off of the reflective surface disposed on the GRIN-fiber lens.

An important aspect of the exemplary embodiments of the beam bending apparatus depicted in the various drawing figures may best be understood with reference to FIG. 2. Depicted in FIG. 2 is a cross-sectional view of the beam bending apparatus 20 depicted in FIG. 1A. As shown in FIG. 2, an optical signal 30 is passed through GRIN-fiber lens 24 and is incident on reflective surface 26, in this case a beveled surface, at an angle of incidence $\Phi_i$ and reflected at an angle of reflection $\Phi_r$. The angle of incidence $\Phi_i$ is defined by the angle between the incident optical signal 30 and a line B normal to the beveled surface, whereas the angle of reflection $\Phi_r$ is defined by the angle between the line B normal to the beveled surface and the reflected beam 30'. When the angle of incident $\Phi_i$ is greater than the critical angle $\Phi_c$ of the media $n_1$ and $n_2$, the optical signal 30 is totally internally reflected and no additional coating is necessary for all of the beam to be reflected. The critical angle $\Phi_c$ can be described by the following equation:

$$\Phi_c = \sin^{-1}(n_2/n_1)$$

In accordance with the present invention, $n_1$ is the refractive index of the medium through which the optical signal is traveling, and $n_2$ is the refractive index of the medium bounding the material through which the optical signal travels. In accordance with the present invention, $n_2$ will typically be the refractive index of air while $n_1$ is the refractive index of GRIN fiber lens 24. In accordance with one aspect of the present invention, if the angle of incidence $\Phi_1$ is greater than the critical angle $\Phi_c$ then other reflective material in addition to the beveled surface defining reflective surface 26 is not necessary.

This being said, if the angle of incidence $\Phi_1$ is less than the critical angle $\Phi_c$, then a beveled surface alone will generally be insufficient to achieve the objectives of the beam re-directing aspects of the present invention. Accordingly, an additional and/or alternative reflective element may be necessary to facilitate the objectives of the present invention. A number of these additional reflective elements will be described below with reference to the various alternative exemplary embodiments of the beam bending apparatus of the present invention depicted in FIGS. 3–5G.

Figure 3:
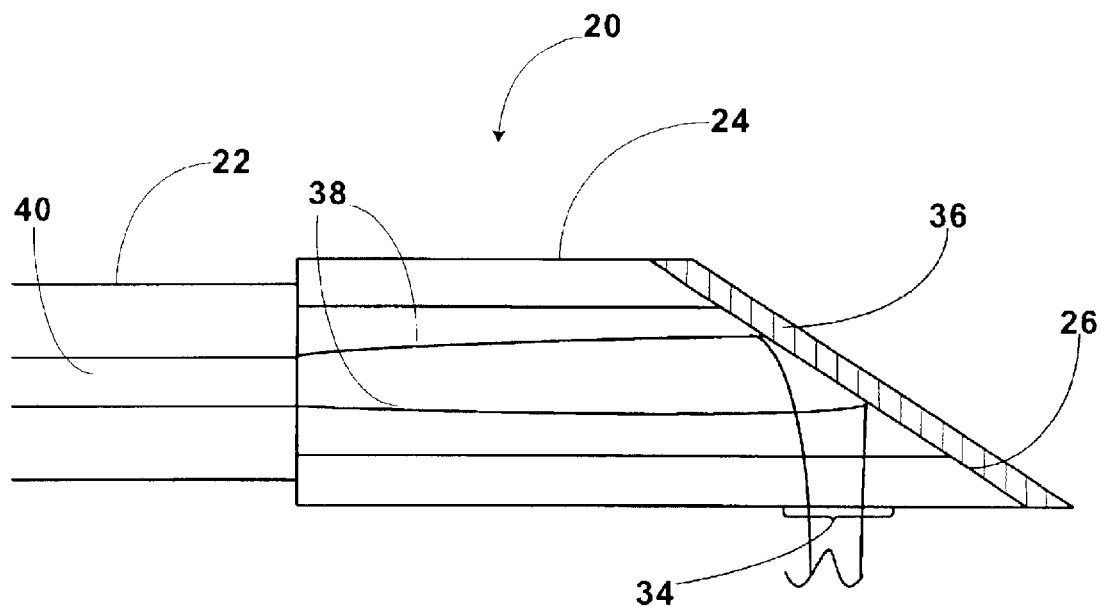
FIG. 3 schematically depicts a cross-sectional view of another alternative exemplary embodiment of the beam bending apparatus of the present invention.

Beam bending apparatus 20 depicted in FIG. 3 preferably includes a pigtail fiber 22, a GRIN fiber lens 24 having an outside diameter greater than the outside diameter of pigtail fiber 22 spliced directly to one end of pigtail fiber 22. In addition to a beveled surface defining reflective surface 26, an additional reflective element 36 may be affixed to or otherwise disposed on reflective surface 26. Such reflective element 36 may be a metallic or di-electric coating material or other functional element such as a bi-refringent or polarizing slab. As will be described in greater detail below, the additional reflective element 36 may be an additional surface, such as an aspherical glass surface disposed on the bevel. As shown in the drawing figure, the optical ray paths 38 exit the core 40 of pigtail fiber 22 and are substantially collimated toward reflective surface 26. At the reflective element 36 and reflective surface 26 interface, at least a substantial amount of the optical signal is redirected towards curved surface 34 of GRIN fiber lens 24. As mentioned previously, curved surface 34 preferably forms a conic surface and functions as a cylindrical lens to focus the beam along one axis but not the other. Thus, if the mode field of the optical signal passing through beam bending apparatus 20 depicted in FIG. 3 is circular in shape while it travels along the optical axis, the circular mode field may preferably be transformed into a substantially elliptical mode field and will be substantially focused at some distance externally of or beneath GRIN fiber lens 24.

Figure 4A:
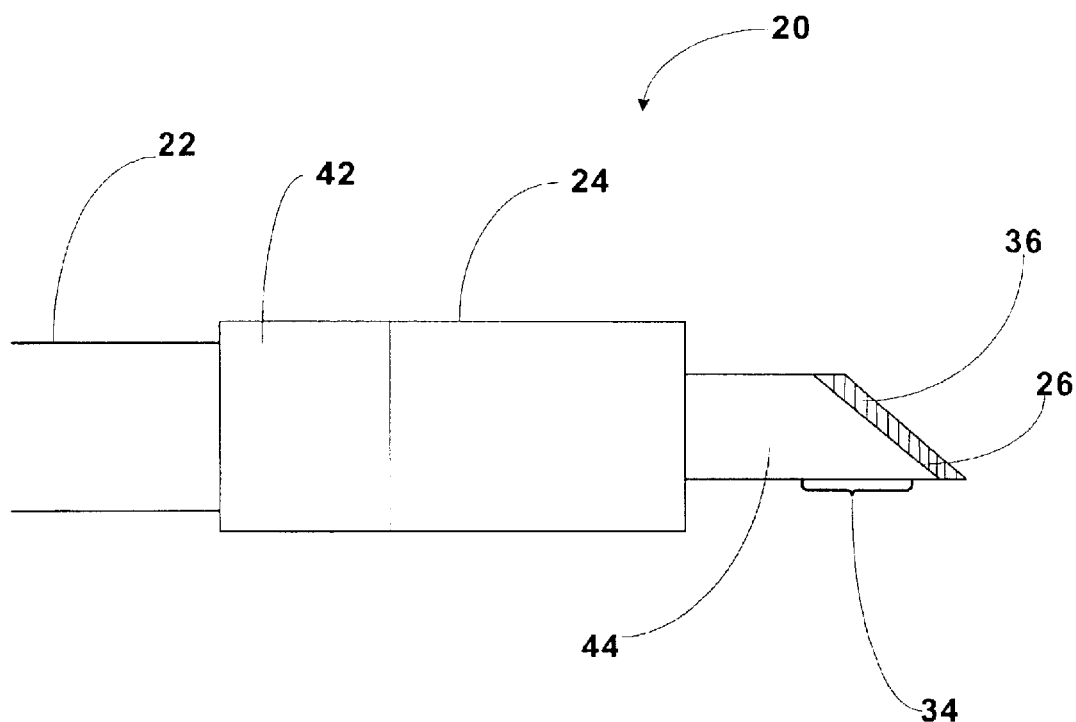
FIG. 4A schematically depicts a side view of an additional alternative exemplary embodiment of the beam bending apparatus of the present invention.
Figure 4B:
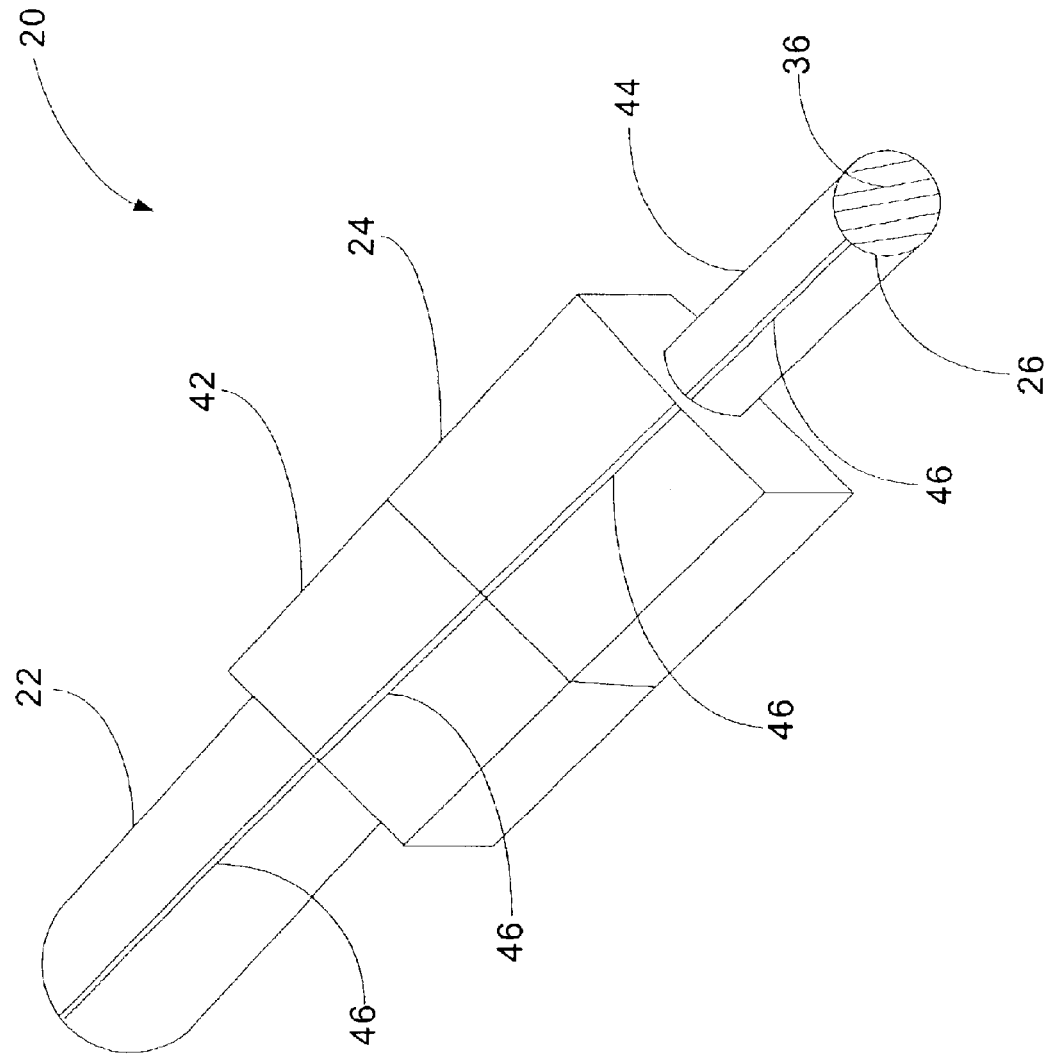
FIG. 4B schematically depicts a perspective view of the beam bending apparatus depicted in FIG. 4A.

An additional exemplary embodiment of beam bending apparatus 24 for altering the mode field of an optical signal is depicted in FIGS. 4A and 4B. Unlike the embodiment depicted in FIG. 3, beam bending apparatus 20 depicted in FIGS. 4A and 4B includes a spacer fiber or spacer rod 42 positioned between pigtail fiber 22 and GRIN fiber lens 24. In addition, a second spacer rod 44 may optionally be positioned between GRIN fiber lens 24 and reflective surface 26. In the embodiment depicted in FIGS. 4A and 4B, reflective surface 26 is disposed on an end of a coreless spacer rod 44 rather than on an end of GRIN-fiber lens 24. Because the angle between the bevel and the optical axis is other than 45° in this exemplary embodiment of the present invention, reflective surface 26 includes an additional reflective element 36, such as a metal coating or di-electric coating, or some other functional element such as a bi-refringent or polarizing slab. Coating element 36 may also include a reflective surface such as an aspherical surface or some other material or device capable of adequately bending an optical signal as required for a given application. Although differing in outside diameter, spacer rods 42 and 44 are preferably coreless glass rods of light carrying material having a uniform or constant radial refractive index profile. In a preferred embodiment, spacer rod 42 and spacer rod 44 are manufactured by a conventional fiber drawing process, cut to the desired length and spliced or otherwise attached to pigtail fiber 22 and/or GRIN-fiber lens 24. Beveled reflective surface 26 disposed on an end of spacer rod 44 remote from GRIN-fiber lens 24 may be formed or otherwise positioned on spacer rod 44 either prior to or after splicing, preferably by polishing or laser micro-machining.

As shown in the perspective view depicted in FIG. 4B, spacer rods 42 and 44 have different outside diameters and spacer rod 42 and GRIN-fiber lens 24 are substantially rectangular in shape, while spacer rod 44 is substantially cylindrical in shape. One of skill in the art will recognize that pigtail fiber 22, GRIN-fiber lens 24, and one or more of the spacer rods may be any geometric shape to include, cylindrical, rectangular, square, or elliptical. In addition, and although not shown in the drawing figures, beam bending apparatus 20 may include GRIN-fiber lenses and spacer rods in addition to those shown in FIGS. 4A and 4B. Generally speaking, the arrangement, shape, outside diameter, length and number of each GRIN-fiber lens and spacer rod employed will preferably be driven by the most cost effective approach to meeting the mode field coupling design specifications for the particular mode-transforming/bending application. Generally speaking, the GRIN-fiber lens 24 or spacer rod 44 on which reflective surface 26 is disposed will preferably include a curved surface 34 that is aspherical in shape in order to provide the desired anamorphic lens effect for a given application. Moreover, and as shown in FIGS. 4A and 4B, spacer rod 42, GRIN-fiber lens 24, and spacer rod 44 may preferably be marked with an alignment feature or groove 46, or otherwise as shown in the drawing figures, to indicate how spacer rod 42, GRIN-fiber lens 24 and spacer rod 44 should preferably be aligned during the manufacturing process in order to maintain the polarization axes of pigtail fiber 22. Such marking is also preferred for the other embodiments of the present invention disclosed herein. One of skill in the art will recognize, however, that such marking is particularly useful when the geometry of the various elements of beam bending apparatus 20 is cylindrical, or otherwise involves non-planar surfaces. Moreover, one of skill in the art will also recognize that the alignment grooves may not be positioned or fashioned on any surface through which an optical signal will pass as such positioning will adversely effect the operation of the present invention.

Beam bending apparatus 20 depicted in FIG. 5A is similar to the embodiment depicted in FIG. 4A. Here, however, spacer rod sections 42 and 44 are shown having the same outside diameter. Moreover, beveled reflective surface 26 shown in FIG. 5A does not include a metallic, dielectric, or other functional coating element such as a bi-refringent or polarizing slab. Instead, a second reflective surface 48, preferably a reflective aspherical surface, is formed on the first reflective surface 26. Reflective aspherical surface 48 may be formed on reflective surface 26 by laser micro-machining, acid etching, polishing, or otherwise as known in the art. Alternatively, an additional reflective material may be affixed to beveled reflective surface 26 via some type of transparent epoxy.

Figure 5B:
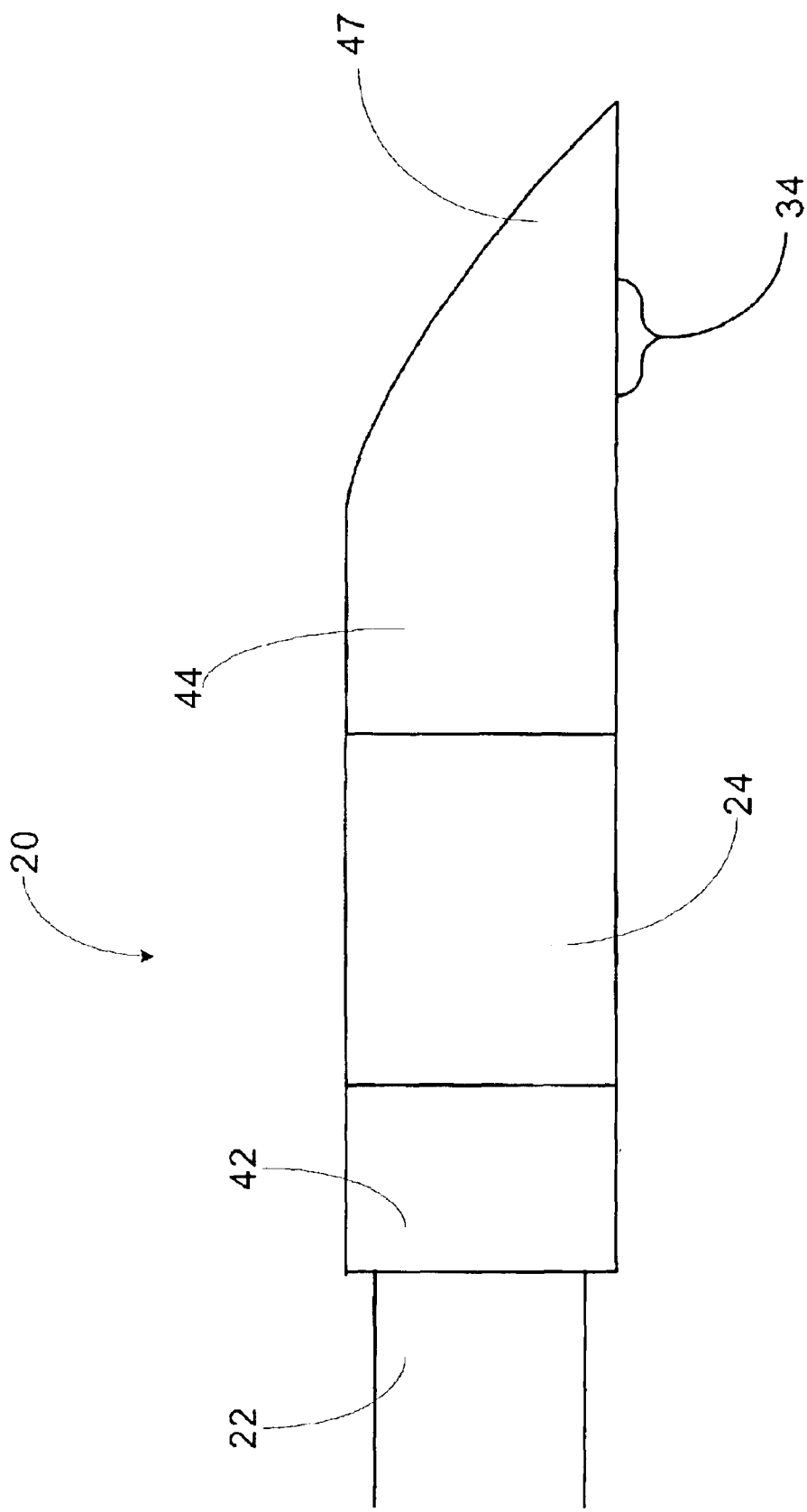
FIG. 5B schematically depicts a side view of a further alternative exemplary embodiment of the beam bending apparatus of the present invention.

Beam bending apparatus 20 depicted in FIG. 5B is similar to the embodiment depicted in FIG. 5A, with the exception of the beam bending feature. More specifically, beam bending apparatus 20 depicted in FIG. 5B does not include a beveled reflected surface 26, nor does it include a second reflective surface 48. Instead, a curved surface 47 is disposed on the end of beam bending apparatus 20 remote from pigtail fiber 22. In accordance with the present invention, curved surface 47 is preferably formed at an angle with respect to the optical axis (not shown) extending longitudinally through beam bending apparatus 20 such that an optical signal directed against curved surface 47 is redirected or bent in accordance with the present invention. In a preferred embodiment, rounded surface 47 may preferably he formed on the end of beam bending apparatus 20 by acid etching, laser micro-machining, or some other machining technique.

Figure 5C:
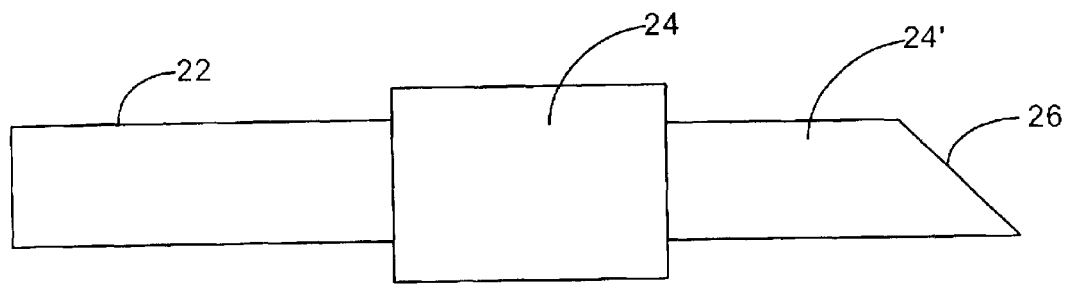
FIG. 5C schematically depicts a side view of a still further alternative exemplary embodiment of the beam bending apparatus of the present invention.

Beam bending apparatus 20 depicted in FIG. 5C includes multiple GRIN-fiber lenses 24 and 24'. Rather than a single GRIN-fiber lens followed or proceeded by a spacer rod, beam bending apparatus 20 depicted in FIG. 5C includes a first GRIN-fiber lens 24 spliced or otherwise affixed to pigtail fiber 22, and a second GRIN-fiber lens 24' spliced or otherwise affixed to first GRIN-fiber lens 24. Like other embodiments described above, a beveled reflective surface 26 is disposed at the end of beam bending apparatus 20 remote from pigtail fiber 22.

Figure 5D:
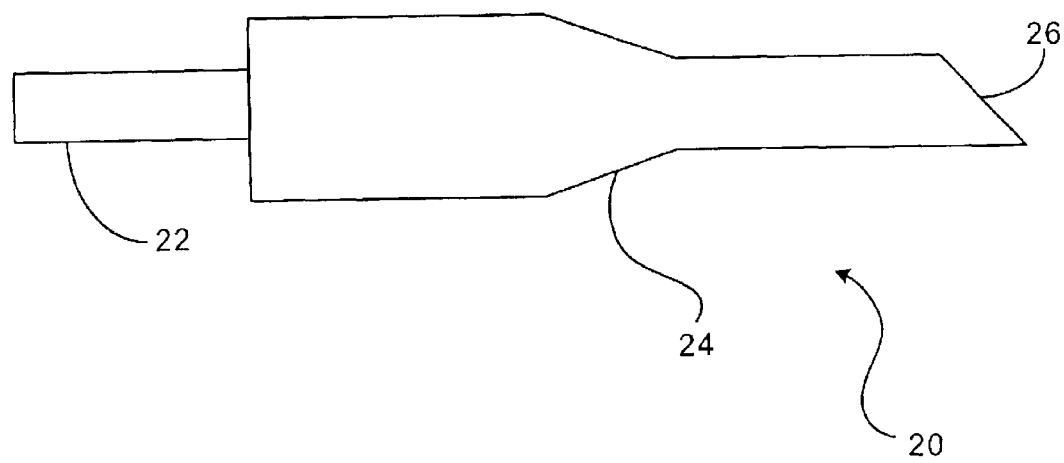
FIG. 5D schematically depicts a side view of yet a further alternative exemplary embodiment of the beam bending apparatus of the present invention.

Beam bending apparatus 20 depicted in FIG. 5D depicts another tapered GRIN-fiber lens 24 spliced or otherwise affixed to a pigtail fiber 22. While the dimensions of tapered GRIN-fiber lens 24 depicted in FIG. 5D differ from those depicted in FIGS. 1C and 1C', the properties and operation of tapered GRIN-fiber lens 24 depicted in FIG. 5D are substantially the same as those described with reference to FIGS. 1C and 1C'.

Beam bending apparatus 20 depicted in FIG. 5E preferably includes a pigtail fiber 22 a coreless spacer rod 42, a GRIN-fiber lens 24 and a reflective surface 26. Unlike the embodiments discussed above, coreless spacer rod 42 preferably includes a rounded end which facilitates splicing of coreless spacer rod 42 to pigtail fiber 22. GRIN-fiber lens 24 is preferably spliced to the other end of coreless spacer rod 42 at one of the ends. The other end of GRIN-fiber lens 24 is preferably taper-cut and preferably thermally shaped into a ball lens 65. Ball lens 65 is preferably polished or otherwise shaped to include a beveled reflective surface 26 for facilitating beam bending. Rounded surface 67 opposite beveled reflective surface 26 on ball lens 65 is preferably a biconic surface defined by two different curves $C_1$ and $C_2$ which are disposed substantially orthogonal to one another and preferably intersect at or near the optical axis. Further details relating to the function of curved surfaces $C_1$ and $C_2$ can be found in co-pending U.S. patent application entitled, "Beam Altering Fiber Lens Device and Method of Manufacture," which is incorporated herein by reference. Those of skill in the art will recognize that the ball lens 65 having a beveled reflective surface 26 and curved surface 67 may alternatively be disposed on the end of a separate spacer rod rather than on the end of a GRIN-fiber lens 24 as depicted in FIG. 5E. Such a beam bending apparatus 20 may preferably be fabricated by splicing spacer rod 42 to GRIN-fiber lens 24, taper-cutting GRIN-fiber lens 24 to the appropriate length and thereafter forming ball lens 65 at the end of GRIN-fiber lens 24 remote from pigtail fiber 22.

An alternative beam bending apparatus 20 is shown in various stages of the manufacturing process in FIGS. 5F and 5G. The beam bending apparatus 20 preferably includes a pigtail fiber 22, a coreless spacer rod 42, a GRIN-fiber lens 24, and a beveled reflective surface 26 remote from pigtail fiber 22. As shown in FIG. 5F, a rounded end 63 is disposed on the end of coreless spacer rod 42 to facilitate splicing of coreless spacer rod 42 to pigtail fiber 22. In accordance with one aspect of the present invention, GRIN-fiber lens 24 of beam bending apparatus 20 is preferably taper-cut to include a taper-cut end 61 remote from pigtail fiber 22. Taper-cut end 61 may then preferably be shaped by polishing or laser micro-machining to form beveled reflective surface 26 as shown in FIG. 5G. Those of skill in the art will recognize that beam bending apparatus 20 of the present invention may include multiple spacer rods and/or multiple GRIN-fiber lenses, or a single spacer rod and multiple GRIN-fiber lenses, or a single GRIN-fiber lens and multiple spacer rods either having the same or differing characteristics, depending on the requirements of a given application and the design approach taken to meet those requirements.

Figure 6A:
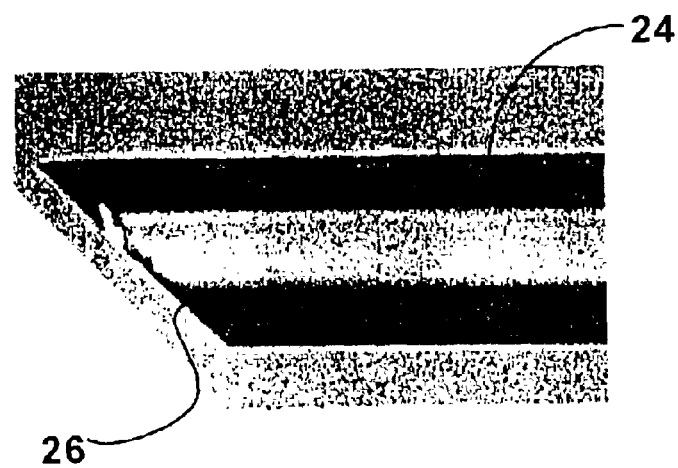
FIGS. 6A–6C are photomicrographs depicting various views of the GRIN-fiber lens of the beam bending apparatus depicted in FIG. 1B showing the optical signal mode fields transformed in accordance with the present invention.
Figure 6B:
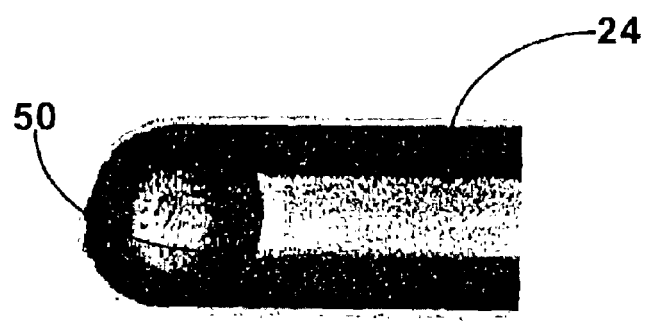
Figure 6C:
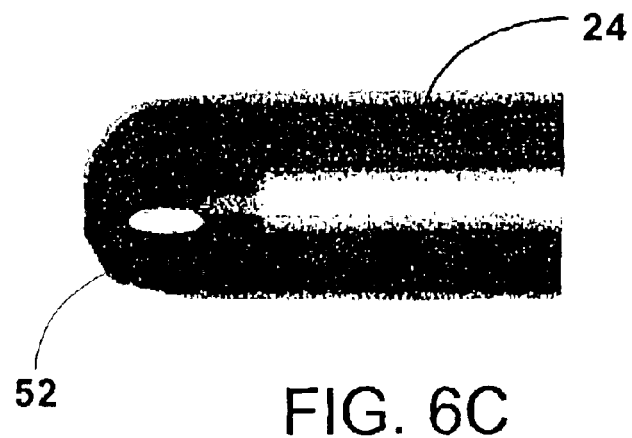

One embodiment of the operation of the beam bending apparatus 20 of the present invention is shown in FIGS. 6A–6C. The drawing figures depict partial views of GRIN-fiber lens 24 having a beveled reflective surface 26. GRIN-fiber lens 24 depicted in FIGS. 6A–6C is preferably affixed to pigtail fiber 22 as disclosed in the exemplary embodiment depicted in FIG. 1B and also preferably includes the features, properties, and functionality of beam bending apparatus 20 depicted in FIG. 1B. This being said, FIG. 6A depicts a side view of GRIN-fiber lens 24 while FIG. 6B and FIG. 6C depict top views of GRIN-fiber lens 24. GRIN-fiber lens 24 depicted in FIG. 6B and FIG. 6C has been rotated approximately 90° from its position shown in FIG. 6A such that beveled reflective surface 26 faces into the page. FIG. 6B shows the mode field 50 with the microscope focused substantially at the GRIN-fiber lens 24 surface. FIG. 6C shows the mode field 52 with the microscope focused at approximately 100.0 microns from the GRIN-fiber 24 surface. Accordingly, in the embodiment depicted in FIG. 6C, an optical component having an elliptical mode field may preferably be coupled to the beam bending apparatus 20 depicted in FIGS. 6A–6C at a distance of approximately 100.0 microns from the curved surface 34 of GRIN-fiber lens surface 33 in order to maximize coupling efficiency and thus minimize optical loss.

A preferred application for the beam bending apparatus as discussed above is for coupling such apparatuses to laser diodes or other high index semiconductor waveguide devices. In such applications, the enhanced functionalities provided by the elements described above provide additional design flexibility and functionality. For example, with a di-electric mirror positioned on a polished bevel, the beam bending apparatus may be designed to reflect a certain percentage of the light that falls on it. For laser diode coupling, such a functionality can be used for monitoring the laser power. In addition, beveled embodiments of the beam bending apparatus of the present invention can be designed to reflect light beams at angles other than 90° in order to provide more options in packaging semiconductor devices with the beam bending apparatus of the present invention. This is particularly true when employing silicon optical bench techniques. As will be described in greater detail below, silicon etch planes may make alignment procedures during packaging much simpler.

As mentioned briefly above, each of the exemplary embodiments of beam bending apparatus 20 disclosed herein share certain common manufacturing techniques. First, an appropriate GRIN-fiber lens having an operative parabolic index of refraction, a core diameter, and an outside diameter and geometric shape is affixed, preferably by splicing, to a selected pigtail fiber, or to one or more spacer rod(s) 42 which is itself spliced to the end of pigtail fiber 22. Such spacer rods 42 are preferably coreless silica containing glass rods, which may be manufactured to have any suitable outside diameter and geometric shape, and which have a uniform or constant radial index of refraction, and thus little or no lensing characteristics. When employed, spacer rods 42 provide additional design flexibility. The GRIN-fiber index, core properties of the GRIN-fiber, and the lensing parameters such as the quarter pitch length may be determined using well known formulas which are disclosed by Emkey and Jack, *Analysis and Evaluation of Graded-Index Fiber-Lenses*, Journal of Lightwave Technology, Vol. LT-5, No. 9, September 1987, pgs. 1156–64, which is hereby incorporated herein by reference.

The GRIN-fiber lens may then be cleaved or taper-cut to the appropriate length compared to the quarter pitch and laser micro-machined to have the appropriate bevel angle with respect to the optical axis. The end of the GRIN-fiber lens 24 so formed may then be polished if desired. The parameters of the GRIN-fiber lens 24, such as the angle of the bevel, may be designed based upon the required working distance and pigtail fiber 22 mode field, and the final mode field shape requirements. Spacer rods, as described above may also be positioned between GRIN-fiber lens 24 and reflective surface 26 of the beam bending apparatus 20 of the present invention when desired or necessary. In such cases, spacer rod(s) 44 may be cleaved or taper-cut as described above, and the end of spacer rod 44 remote from GRIN-fiber lens 24 may be further processed as described above to arrive at the desired beveled reflective surface on the spacer rod rather than on the GRIN-fiber lens.

It is also possible to arrive at a variety of designs where the core or the outside diameter, size, shape and index difference of the GRIN-fiber lens 24 and pigtail fibers 22 can be varied for different applications. For example, it is possible to have the outside diameter of the GRIN-fiber lens the same, smaller, or larger than the pigtail fiber to accommodate beams of varying size. The shape of the GRIN-fiber lens, the pigtail fiber, and any spacer rods can be non-cylindrical, such as square or rectangular, or may be marked with grooves or otherwise for ease of manufacturing and to facilitate alignment with the polarization axis of the pigtail fiber. By aligning the planar sides or markings with the polarization axes of the pigtail fiber, further processing, such as coupling to a laser diode or other optical component with proper polarization axes is simplified.

Figure 7C:
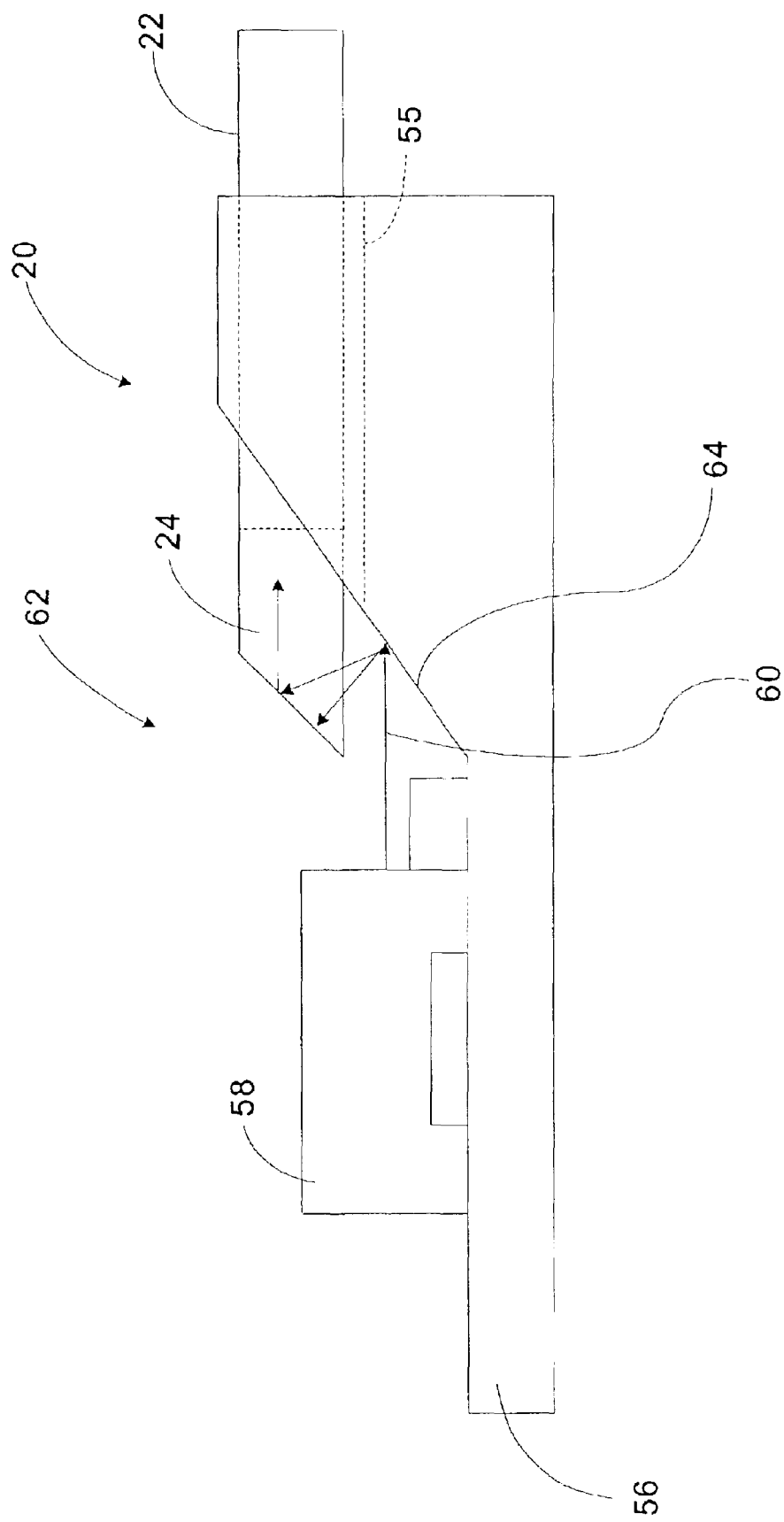
FIG. 7C schematically depicts a side view of an alternative exemplary embodiment of an optical assembly incorporating the beam bending apparatus depicted in FIG. 1B in accordance with the present invention.

Exemplary optical assemblies incorporating beam bending apparatuses 20 in accordance with the present invention are depicted in FIGS. 7A–7C. Optical assembly 54 depicted in FIG. 7A and FIG. 7B preferably includes a substrate 56 and a source of an optical signal 58 such as, but not limited to, a laser diode or other emitter. The source of an optical signal 58 is preferably supported on substrate 56 and a beam bending apparatus 20 in accordance with the present invention is also preferably positioned on substrate 56 such that GRIN-fiber lens 24 is capable of communicating with the optical source 58. As shown clearly in FIG. 7B, optical source 58 emits an optical signal 60, which is passed through conic surface 34 formed on a sidewall of GRIN-fiber lens 24. Optical signal 60 is thereafter reflected at the medium glass interface (typically an air/glass interface) defined by reflective surface 26 such that optical signals 60 are redirected along the optical axis of GRIN-fiber lens 24 and pigtail fiber 22. In a preferred embodiment, the mode field of optical signal 60 is also preferably transformed from the elliptical mode field emitted from optical signal source 58 to a substantially circularly symmetric mode field for coupling transformed optical signal 60 to pigtail fiber 22 with low loss.

A particular advantage to the configuration depicted in FIGS. 7A and 7B is its tolerance to environmental effects. Since the alignment tolerances between optical signals source 58 and GRIN-fiber lens 24 are broad due to the orientation of GRIN-fiber lens 24 in relation to optical signal source 58 emitter, environmental conditions such as changes in temperature, humidity, etc., will have little effect on the operation and functionality of the assembly 54.

An additional alternative embodiment of an assembly 62 is depicted in FIG. 7C. The embodiment is similar to assembly 54 depicted in FIGS. 7A–B, but utilizes a silicon optical bench or other substrate to reflect optical signal 60 into GRIN-fiber lens 24. This arrangement is particularly well suited for use with a silicon optical bench having a <111>facet 64 etched or otherwise formed on the silicon substrate 56 and a V-groove 55 etched or otherwise fabricated to support the beam bending apparatus 20. In a preferred embodiment, <111>facet 64 is arranged at an angle of approximately 55°. Generally speaking, reflective surface 26 will be beveled to match (be parallel) to the <111>facet, thus making alignment and manufacture of the assembly 62 depicted in FIG. 7C less complex.

Although not shown in the drawing figures, it is also important that the wave fronts are matched as closely as possible. Failure to do so may result in aberrations, which are the result of constructive or destructive interference with coupling efficiency. In the past, those skilled in the art adjusted the properties of the lenses, for instance, the GRIN-fiber lens, such as the refractive index profile of the GRIN-fiber lens, by actually changing the chemical properties of the glass itself. This is very time consuming and does not facilitate the efficient manufacture of mode field coupling assemblies. In accordance with the present invention, the size and shape of the GRIN-fiber lens, the use of spacer rods which act to move the optical signal image without adding any significant lens affect to the optical image, the size and number of spacer rods, the number of GRIN-fiber lenses, and the independent control (in the X-plane and Y-plane) of the shape of the external curved surface 34, 35 defining the lens in accordance with the present invention, enable those skilled in the art to easily and efficiently substantially match these wave fronts in a manner that is practical and efficient and cost effective for mass manufacture of mode field coupling assemblies. In addition, and although not shown in the figures discussed above, the above-mentioned principles are equally applicable to those embodiments of the optical assembly of the present invention where the optical signal is directed through the pigtail fiber, then through any spacer rods utilized, through the GRIN-fiber lens, where the optical signal may preferably be redirected by a reflective surface and thereafter passed through an external curved surface 34, 35 of the GRIN-fiber lens (or spacer rod) for coupling to an optical waveguide device, such as, but not limited to an SOA or other detector/photo-diode.

EXAMPLE

An example of an off-line or non-in-line beam bending apparatus and optical assembly in accordance with the above-mentioned embodiments of the present invention will now be described.

Figure 8:
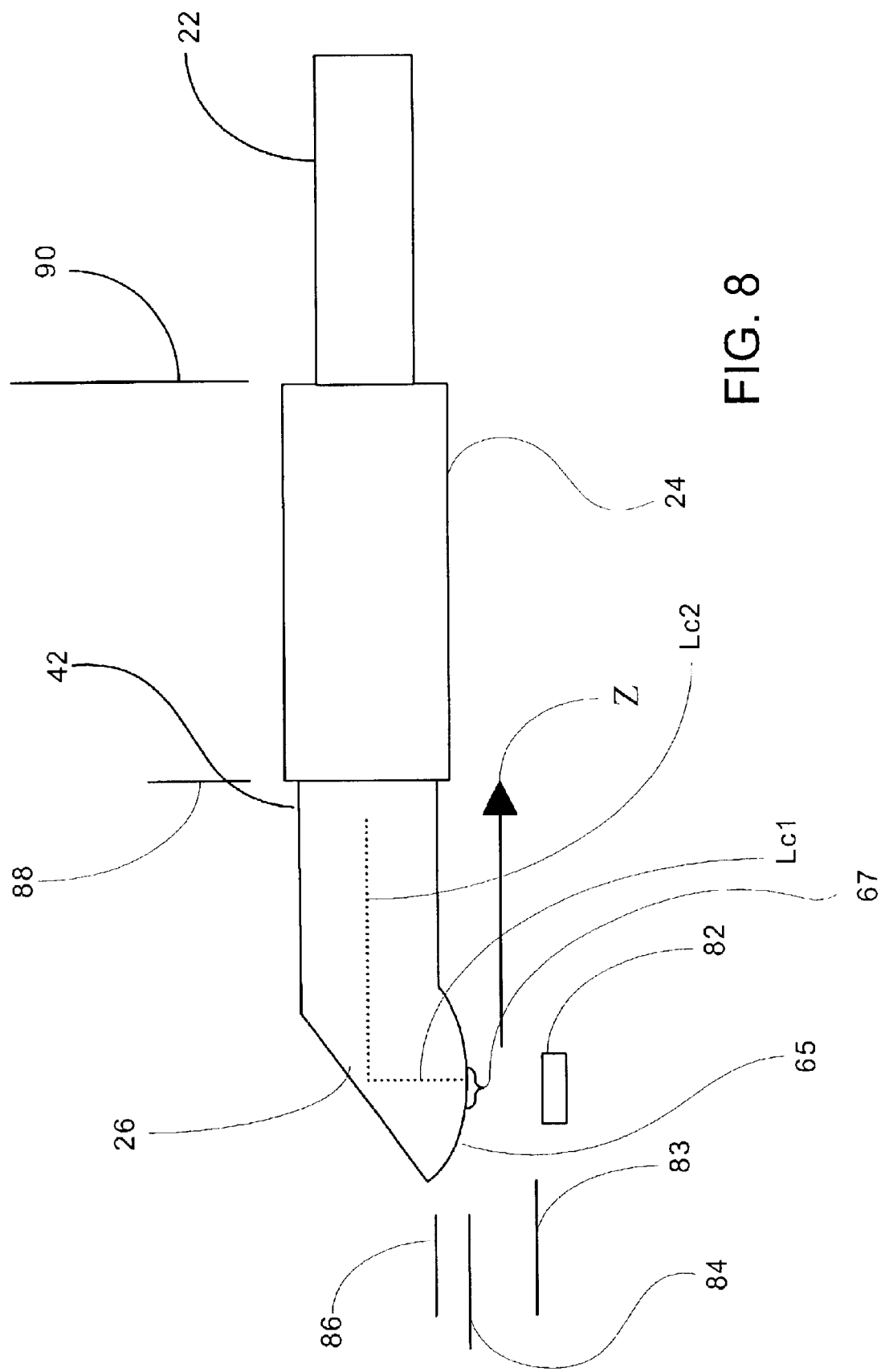
FIG. 8 schematically illustrates the arrangement of the off-line beam bending apparatus of the present invention, including the designation of the various design variables.

An exemplary off-line beam bending apparatus 80, including a ball lens 65 having a biconic curved surface 67 and a beveled reflective surface 26, is shown schematically in FIG. 8 with reference to the variables described below. The exemplary multi-lens apparatus includes a source 82 of an optical signal, in this case a laser diode capable of emitting a signal at an operating wavelength 'wav'; Mode-field-diameter (MFD) in the x-direction (vertical direction) of wx0 ($\mu$m), and MFD in the y-direction of wy0 ($\mu$m). The beam from the source 82 propagates through a medium (most commonly air) of index (n1) for a distance (z) before falling on a curved surface 67 with radii of curvature of (RLx) ($\mu$m) in the x-direction and (Rly) ($\mu$m) in the y-direction that is formed on a spacer rod 42 having a radially constant refractive index profile and a length (Lc) and index (nc). The MFD of the optical signal before the cylindrical biconic lens is wx1, and wy1, and beam wavefront radii of curvature are rx1, and ry1. The optical signal is transformed by the biconic lens to a beam with MFD and wavefront radii of curvatures of wx2, wy2 and rx2, ry2, respectively. For a thin lens, wx1=wx2 and wy1=wy2, but rx2 and ry2 are not generally the same as rx1 and ry1. The beam then propagates through the spacer rod 42 section of length Lc and index nc. The length Lc of spacer rod 42 includes the length of the spacer rod before beveled reflective surface 26 (Lc1) and the length of spacer rod 42 extending from beveled reflective surface 26 to GRIN-fiber lens 24. In the embodiment shown, beveled reflective surface 26 is assured to bend the optical signal by 90°. The beam characteristics after this propagation are wx3, wy3 and rx3, and ry3. A beam having these characteristics falls on the GRIN-fiber lens 24 with characteristics of length Lg, average index ng, index diff=delta, and core radius of (a). After propogating through the GRIN-fiber lens 24 the beam characteristics are wx4, wy4, rx4, ry4. The objective of the design is to make wx4=wy4=wsmf, where (wsmf) is the circular MFD of the standard single mode pigtail fiber 22. Another objective is to make rx4 and ry4 as close to a flat wavefront as possible to maximize the coupling efficiency to the pigtail fiber. This objective may be achieved for any given source 82 and pigtail fiber 22 by modifying the design variables such as Z, Rx, Ry, Lc of the curved surface 67, ball lens 65, the spacer rod 42, and also the characteristics of the GRIN-fiber lens 24, such as Lg, Delta, and (a). The objective also is to make Z reasonably large for reasonable tolerances and practical packaging requirements without compromising the coupling efficiency.

The beam transformation can be calculated for the gaussian beams using the ABCD matrix procedures for the complex beam parameter q as disclosed in the references incorporated herein by reference, or using the beam propagation techniques. The design is preferably optimized for the best coupling efficiency for any desired z, as well as the source 82 and pigtail fiber 22 characteristics. The material characteristics n1, nc, ng, and ns can be varied to some extent, but practical material considerations limit their values. For example, n1 is generally equal to 1 (air), nc is mostly silica or doped silica with values of ~1.45 near the 1.3–1.55 $\mu$m wavelength range. The same is true for ng and nsmf.

Complex beam parameter q is defined as:

$$(1/q)=(1/r)-i*(\text{wav}/(pi*w^2*n)$$

where r is the wavefront radius of curvature, w is the gaussian mode field radius, and wav is the wavelength of light.

The q parameter transformation from input plane 84 to output plane 86 is given by:

$$q2=(A*q1+B)/(C*q1+D)$$

where A,B,C,D are the elements of the ray matrix relating the ray parameters of the input and output plane, 84 and 86, respectively.

1) ABCD matrix for free space propagation of length $z = \begin{bmatrix} 1 & z \\ 0 & 1 \end{bmatrix}$ 2) for going from a medium of index $n1$ to $n$(no length) $= \begin{bmatrix} 1 & 0 \\ 0 & (n1/n) \end{bmatrix}$ 3) for a lens of radius of curvature $R = \begin{bmatrix} 1 & 0 \\ -(n2-n1)/(n2*R) & n1/n2 \end{bmatrix}$ 4) for GRIN-fiber Lens $n'(r) = n(1 - g^{\wedge}2*r^{\wedge}2)^{\wedge}0.5$ and length $L = \begin{bmatrix} \cos(gL) & (\sin(gL)/g) \\ -g*\sin(gL) & \cos(gl) \end{bmatrix}$ $g = ((2*\text{delta})^{\wedge}0.5)/a$ The lens geometry and the variables of the design and MFD parameters at specific locations:

Plane 83: Output of source 82: wav, wx0, wy0—Wavelength and x, and y mode fields of the source 82

Plane 84: Propagate through Z, of material index (n1) but before the biconic lens
   wx1, wy1: Mode field diameters of the beam at plane 84
   rx1, ry1: Wavefront Radius of Curvature Plane 86: Just after the biconic lens of radius Rx and Ry with material index nc
   wx2, wy2
   rx2, ry2

Plane 88: Propagation in spacer rod of length Lc, and index nc and just in front of the GRIN-fiber lens 24
   wx3, wy3
   rx3, ry3

Plane 90: After propagation through GRIN-fiber lens 24 with Length Lg, Avg Index ng, index diff=Delta, core rad=a and just in front of the pigtail fiber:
   wx4, wy4
   rx4, ry4

Specific Examples for the Off-Line Beam Bending Apparatus

Figure 9:
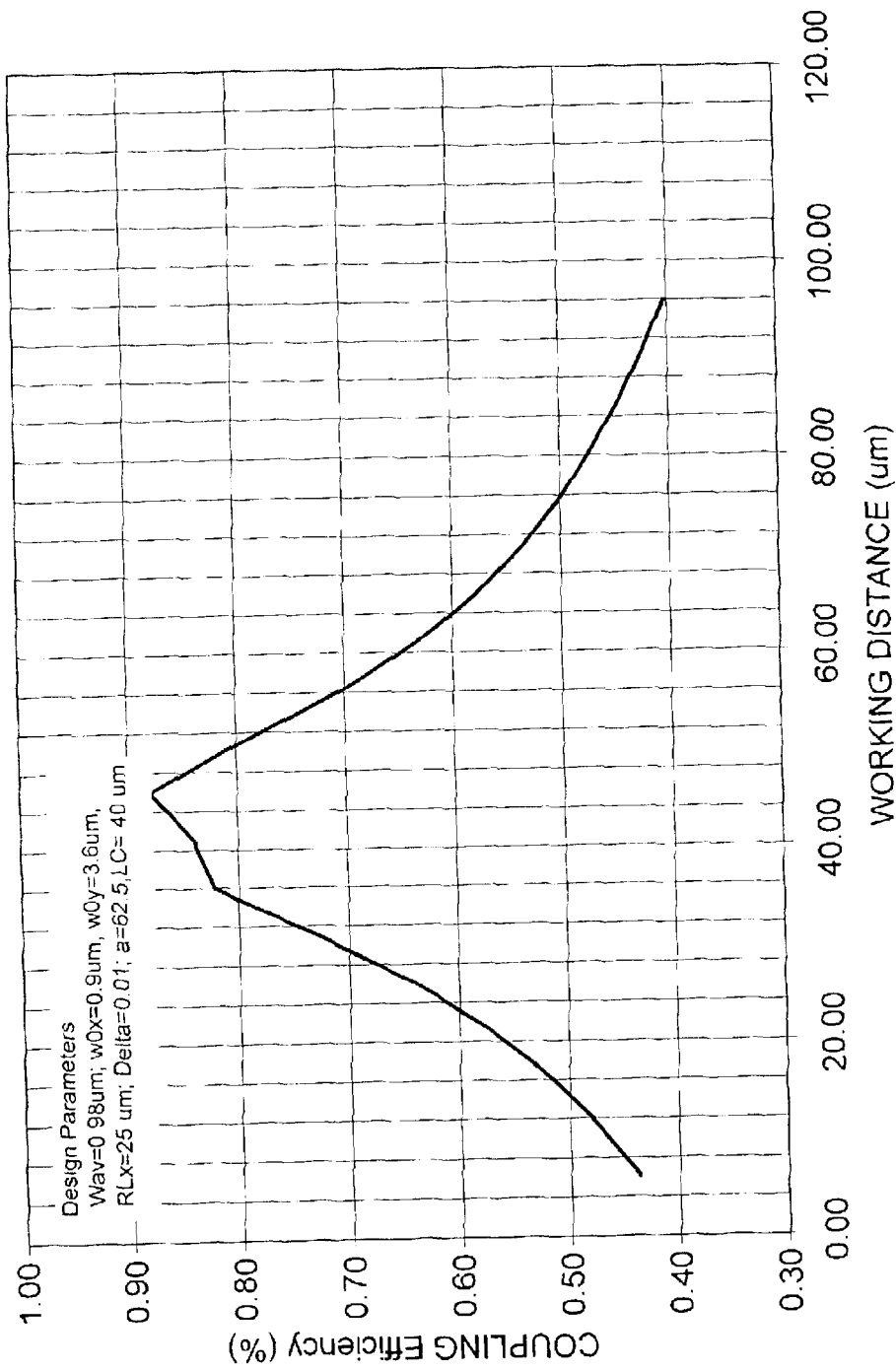
FIG. 9 is a graph depicting the coupling efficiency versus working distance curve for an exemplary off-line assembly in accordance with the present invention.

Using the procedure indicated above, the design variables of the beam bending apparatus for a laser diode coupling application may be calculated and optimized. Coupling efficiency calculations done as a function of working distance are shown in FIG. 9. Based on this curve, the optimum working distance for this design is approximately 50.0 μm, which is a reasonable value for practical packaging and alignment requirements. The laser diode characteristics and other design parameters are listed below:

| Laser diode characteristics: | |
|---|---|
| Wavelength: | 0.98 μm |
| Mode-field radius in X-direction w0x: | 0.9 μm |
| Mode Filed radius in Y-direction w0y: | 3.6 μm |
| OTHER DESIGN PARAMETERS | |
| X-radius of curvature of biconic lens RLx | 25 μm |
| Length of spacer rod Lc: | 40.0 |
| GRIN-fiber Length Lg: | 1170 μm |
| GRIN-fiber Index Difference Delta: | 0.01 |
| GRIN-fiber Core Radius a: | 62.5 |
| Single mode pigtail fiber Mode-field: | 5.2 μm |

The example is given for illustrative purposes only and will vary based on the applications. The foregoing example may be more clearly understood with reference to the following references: W. L. Emkey and C. Jack, JLT-5 September 1987, pp.1156–64; H. Kogelnik, Applied Optics, Dec. 4, 1965, p1562; R. Kishimoto, M. Koyama; *Transactions on Microwave Theory and Applications*, IEEE MTT-30, June 1982, p882; and *Photonics* by B. E. A. Saleh and M. C. Teich, John Wiley & Sons, Inc., 1991, each of which is hereby incorporated herein by reference.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. For example, GRIN-fiber lens 24 may be manufactured such that its refractive index profile varies longitudinally rather than radially as described above. In addition, one of skill in the art will recognize that the various components/elements of beam bending apparatus 20 of the present invention need not be manufactured from nor embody the same materials, provided the various materials forming the various elements of beam bending apparatus 20 are compatible with respect to characteristics, such as, but not limited to, softening point, and coefficient of thermal expansion. Therefore, the above mentioned description is to be considered exemplary, rather than limiting, and the true scope of the invention is that defined in the following claims.

What is claimed is:

1. An apparatus for altering the mode field of an optical signal, the apparatus comprising:
   a GRIN-fiber lens including a ball lens having a biconic curved surface; and
   a reflective surface disposed at one end of the GRIN-fiber lens on at least a portion of the ball lens, the reflective surface configured to cooperate with the GRIN-fiber lens to redirect the path of an optical signal directed against the reflective surface.

2. The apparatus of claim 1 further comprising an optical fiber, and wherein the end of the GRIN-fiber lens remote from the reflective surface is affixed to the optical fiber.

3. The apparatus of claim 2 wherein the GRIN-fiber lens includes a rounded end opposite the reflective surface for facilitating attachment to the optical fiber.

4. The apparatus of claim 2 wherein the apparatus further includes one or more spacer rods each having a radially constant index of refraction, and wherein the one or more spacer rods are positioned between the optical fiber and the GRIN-fiber lens or the GRIN-fiber lens and the reflective surface.

5. The apparatus of claim 4 wherein one or more of the spacer rods each includes an outside diameter different from the outside diameter of the optical fiber and the GRIN-fiber lens.

6. The apparatus of claim 4 wherein each of the optical fiber, the GRIN-fiber lens, and the one or more spacer rods define an outside diameter and wherein the outside diameters differ in size from one another.

7. The apparatus of claim 4 wherein one or more of the optical fiber, the GRIN-fiber lens, and the one or more spacer rods comprises a geometric shape other than cylindrical.

8. The apparatus of claim 7 wherein the geometric shape comprises a rectangle.

9. The apparatus of claim 7 wherein the geometric shape comprises a square.

10. The apparatus of claim 7 wherein the geometric shape comprises an ellipsoid.

11. The apparatus of claim 2 wherein the apparatus further includes one or more spacer rods each having a radially constant index of refraction, and wherein the one or more spacer rods are positioned between the optical fiber and the GRIN-fiber lens and the GRIN-fiber lens and the reflective surface.

12. The apparatus of claim 1 wherein the reflective surface comprises a curved surface.

13. The apparatus of claim 12 wherein the curved surface of the reflective surface is inclined at an angle to the longitudinal axis of the GRIN-fiber and formed on the end of the GRIN-fiber lens by polishing or laser micromachining.

14. The apparatus of claim 1 wherein the GRIN-fiber lens comprises a tapered region.

15. The apparatus of claim 1 wherein the GRIN-fiber lens includes a planar surface positioned with respect to the reflective surface to communicate with an optical signal entering or exiting the apparatus.

16. The apparatus of claim 1 wherein the reflective surface comprises a beveled surface.

17. The apparatus of claim 16 wherein the beveled surface is formed on the end of the GRIN-fiber lens.

18. The apparatus of claim 16 wherein the beveled surface includes a reflective material.

19. The apparatus of claim 16 wherein the reflective material comprises a metallic coating.

20. The apparatus of claim 18 wherein the reflective material comprises a dielectric coating.

21. The apparatus of claim 1 wherein the reflective surface comprises a beveled surface and a reflective aspherical surface formed on the beveled surface.

22. The apparatus of claim 1 wherein the GRIN-fiber lens comprises a longitudinal surface including a lens.

23. An apparatus for altering the mode field of an optical signal, the apparatus comprising:
   a GRIN-fiber lens; and
   a reflective surface disposed at one end of the GRIN-fiber lens, the reflective surface configured to cooperate with the GRIN-fiber lens to redirect the path of an optical signal directed against the reflective surface, wherein the GRIN-fiber lens includes a curved surface positioned with respect to the reflective surface to communicate with an optical signal entering or exiting the apparatus, and
   wherein the apparatus defines an optical axis and wherein the curved surface is defined by two different curves disposed substantially orthogonal to one another, a major curve $C_1$ and a minor curve $C_2$, wherein $C_1$ and $C_2$ intersect at or near the optical axis.

24. An apparatus for altering the mode field of an optical signal, the apparatus comprising:
   a GRIN-fiber lens; and
   a reflective surface disposed at one end of the GRIN-fiber lens, the reflective surface configured to cooperate with the GRIN-fiber lens to redirect the path of an optical signal directed against the reflective surface, wherein the reflective surface comprises a beveled surface including a reflective material selected from the group consisting of a birefringent slab or a polarizing slab.

25. An apparatus for altering the mode field of an optical signal, the apparatus comprising:
   a GRIN-fiber lens;
   a reflective surface disposed at one end of the GRIN-fiber lens, the reflective surface configured to cooperate with the GRIN-fiber lens to redirect the path of an optical signal directed against the reflective surface; and
   an optical fiber, wherein the end of the GRIN-fiber lens remote from the reflective surface is affixed to the optical fiber, and wherein the GRIN-fiber lens comprises a plurality of GRIN-fiber lenses, and wherein the multi-lens apparatus further includes one or more spacer rods each having a radially constant index of refraction, and wherein the one or more spacer rods are positioned between one or more of the optical fiber and the plurality of GRIN-fiber lenses.

26. An optical assembly comprising:
   an optical component comprising a laser diode;
   a substrate configured to support the component; and
   an apparatus positioned on the substrate and in relation to the optical component to change the mode field of an optical signal passed between the apparatus and the optical component, wherein the apparatus includes a GRIN-fiber lens including a ball lens having a biconic curved surface and a reflective surface disposed on one end of the GRIN-fiber lens on at least a portion of the ball lens, the reflective surface configured to cooperate with the GRIN-fiber lens to redirect the path of an optical signal directed against the reflective surface.

27. The optical assembly of claim 26 wherein the substrate comprises a silicon optical bench.

28. The optical assembly of claim 22 wherein the silicon optical bench includes a V-groove for supporting the apparatus in relation to the laser diode such that an optical signal passed between the laser diode and the apparatus is efficiently coupled.

29. The optical assembly of claim 27 wherein the silicon optical bench includes a <111>facet and a V-groove for supporting the apparatus in relation to the laser diode.

30. The optical assembly of claim 29 wherein an optical signal passed between the laser diode and the apparatus is received by and coupled to the apparatus alter the optical signal is reflected off of the <111>facet.

31. The optical assembly of claim 26 wherein the apparatus further includes an optical fiber and one or more spacer rods each having a radially constant index of refraction, and wherein the one or more spacer rods are positioned between one or more of the optical fiber, the GRIN-fiber lens and the reflective surface.

32. The optical assembly of claim 31 wherein one or more of the optical fiber, the GRIN-fiber lens and the one or more spacer rods comprises a geometric shape other than cylindrical.

33. The optical assembly of claim 31 wherein the one or more of the optical fiber, the GRIN-fiber lens and the one or more spacer rods include an alignment feature.

34. A method of manufacturing an apparatus for altering the mode field of an optical signal, the method comprising step of:
   disposing a reflective surface at an end of a GRIN-fiber lens including a ball lens having a biconic curved surface, wherein the reflective surface is disposed on at least a portion of the ball lens, and is configured to cooperate with the GRIN-fiber lens to redirect the path of an optical signal directed against the reflective surface.

35. The method of claim 34 further comprising the step of affixing an optical fiber to the end of the GRIN-fiber lens remote from the reflective surface.

36. The method of claim 35 wherein the affixing step comprises the step of splicing one end of the GRIN-fiber lens to one end of the optical fiber.

37. The method of claim 35 further comprising the step of inserting one or more spacer rods between the optical fiber and the GRIN-fiber lens, and the GRIN-fiber lens and tile reflective surface.

38. The method of claim 35 further comprising the step of inserting one or more spacer rods between the optical fiber and the GRIN-fiber lens, or between the GRIN-fiber lens and the reflective surface.

39. The method of claim 38 wherein the disposing step comprises the step of laser micro-machining the end of the GRIN-fiber lens or spacer rod most remote from the optical fiber to form a beveled surface.

40. The method of claim 38 wherein the disposing step comprises the step of polishing the end of the GRIN-fiber lens or spacer rod most remote from the optical fiber to form a beveled surface.

* * * * *